United States Patent
Doheny et al.

(10) Patent No.: US 10,506,682 B2
(45) Date of Patent: *Dec. 10, 2019

(54) CONFIGURABLE LIGHTING SYSTEM

(71) Applicant: Eaton Intelligent Power Limited, Dublin (IE)

(72) Inventors: Seth Doheny, Newman, GA (US); Steven Walter Pyshos, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,741

(22) Filed: Aug. 22, 2018

(65) Prior Publication Data

US 2018/0368232 A1    Dec. 20, 2018

Related U.S. Application Data

(63) Continuation of application No. 15/727,833, filed on Oct. 9, 2017, now Pat. No. 10,117,300, which is a
(Continued)

(51) Int. Cl.
*H05B 33/08* (2006.01)
*H05B 37/02* (2006.01)
(Continued)

(52) U.S. Cl.
CPC .......... *H05B 33/0863* (2013.01); *F21S 8/026* (2013.01); *F21V 5/04* (2013.01);
(Continued)

(58) Field of Classification Search
CPC ...... H05B 7/02; H05B 37/0272; H05B 33/08; H05B 33/0845; H05B 33/0863;
(Continued)

(56) References Cited

U.S. PATENT DOCUMENTS 6,127,783 A    10/2000   Pashley et al.
6,149,283 A    11/2000   Conway et al.
(Continued)

FOREIGN PATENT DOCUMENTS

CN    201844227    5/2011

OTHER PUBLICATIONS

Test Report of California Appliance Efficiency Compliance for Permanently Installed High Efficacy LEDs under Title 24, issued Nov. 18, 2015.
(Continued)

*Primary Examiner* — Jimmy T Vu
(74) *Attorney, Agent, or Firm* — King & Spalding LLP

(57) ABSTRACT

A luminaire can include a power supply that receives AC mains power from a power source and delivers intermediate power, and can also include a lumen control module coupled to the power supply, where the lumen control module receives the intermediate power from the power source. The lumen control module can include at least one first switch that has multiple positions, and multiple resistors coupled to the at least one first switch, where each position of the at least one first switch corresponds to a resistance of the resistors, where the intermediate power received by the resistors is translated to a current level of a plurality of current levels based on the resistance. The luminaire can also include at least one light source coupled to the lumen control module, where the at least one light source emits a lumen output based on the current level received from the lumen control module.

20 Claims, 15 Drawing Sheets

Related U.S. Application Data continuation-in-part of application No. 15/435,141, filed on Feb. 16, 2017, now Pat. No. 9,820,350.

(60) Provisional application No. 62/297,424, filed on Feb. 19, 2016.

(51) Int. Cl.
| | |
|---|---|
| *F21V 23/00* | (2015.01) |
| *F21V 7/00* | (2006.01) |
| *F21V 17/12* | (2006.01) |
| *F21V 5/04* | (2006.01) |
| *F21V 23/06* | (2006.01) |
| *F21S 8/02* | (2006.01) |
| *F21V 19/00* | (2006.01) |
| *F21Y 115/10* | (2016.01) |
| *F21Y 113/13* | (2016.01) |

(52) U.S. Cl.
CPC .............. *F21V 7/00* (2013.01); *F21V 17/12* (2013.01); *F21V 19/0015* (2013.01); *F21V 23/001* (2013.01); *F21V 23/06* (2013.01); *H05B 33/0803* (2013.01); *H05B 33/0806* (2013.01); *H05B 33/089* (2013.01); *H05B 33/0827* (2013.01); *H05B 33/0845* (2013.01); *H05B 37/0245* (2013.01); *H05B 37/0272* (2013.01); *F21Y 2113/13* (2016.08); *F21Y 2115/10* (2016.08); *H05B 37/0227* (2013.01)

(58) Field of Classification Search
CPC .......... H05B 33/089; F21K 9/62; F21S 8/026; F21V 3/02; F21V 5/04; F21V 7/00; F21V 17/12; F21V 21/088; F21V 23/001; F21V 19/0015; F21Y 2113/13; F21Y 2215/10
USPC ........ 315/151, 185 R, 209 R, 291, 294, 307, 315/308, 312
See application file for complete search history.

(56) References Cited

U.S. PATENT DOCUMENTS

| | | | |
|---|---|---|---|
| 6,201,351 B1* | 3/2001 | Rudolph | H05B 39/081 |
| | | | 315/155 |
| 7,014,336 B1 | 3/2006 | Ducharme | |
| 7,255,457 B2 | 8/2007 | Ducharme | |
| 7,416,312 B1* | 8/2008 | McDermott | F21V 5/046 |
| | | | 362/216 |
| 7,926,300 B2 | 4/2011 | Roberts | |
| 8,172,415 B2 | 5/2012 | Wegh | |
| 8,317,362 B2 | 11/2012 | Ku et al. | |
| 8,598,793 B2 | 12/2013 | Yan | |
| 8,872,438 B2 | 10/2014 | Zhou | |
| 8,941,312 B2 | 1/2015 | McRae | |
| 8,947,013 B2 | 2/2015 | Sutardja et al. | |
| 9,072,148 B2 | 6/2015 | Tanaka et al. | |
| 9,144,129 B2 | 9/2015 | Munday et al. | |
| 9,820,350 B2 | 11/2017 | Pychos | |
| 9,892,693 B1 | 2/2018 | Kumar | |
| 10,091,855 B2 | 10/2018 | Van Winkle | |
| 10,136,503 B2 | 11/2018 | Chen | |
| 2005/0077837 A1 | 4/2005 | Kim | |
| 2006/0220586 A1 | 10/2006 | Latham | |
| 2008/0060917 A1 | 3/2008 | Chia-Li et al. | |
| 2010/0237798 A1 | 9/2010 | Wolf | |
| 2013/0114241 A1 | 5/2013 | Van de Ven et al. | |
| 2013/0328503 A1 | 12/2013 | Toda | |
| 2014/0210357 A1 | 7/2014 | Yan et al. | |
| 2014/0210376 A1 | 7/2014 | Hicks | |
| 2015/0054410 A1 | 2/2015 | Sanders et al. | |
| 2017/0019973 A1 | 1/2017 | Beck et al. | |
| 2017/0086265 A1 | 3/2017 | Akiyama et al. | |
| 2017/0105265 A1 | 4/2017 | Sadwick | |

OTHER PUBLICATIONS

Energy Star, Certificate of Compliance; Certificate No. 1129756, issued Nov. 25, 2015.
Test Report of IES LM-79-08; Approved Method: Electrical and Photometric Measurements of Solid-State Lighting Products; issued Nov. 18, 2015.
International Search Report for PCT/US2018/047718, dated Nov. 29, 2018.

* cited by examiner

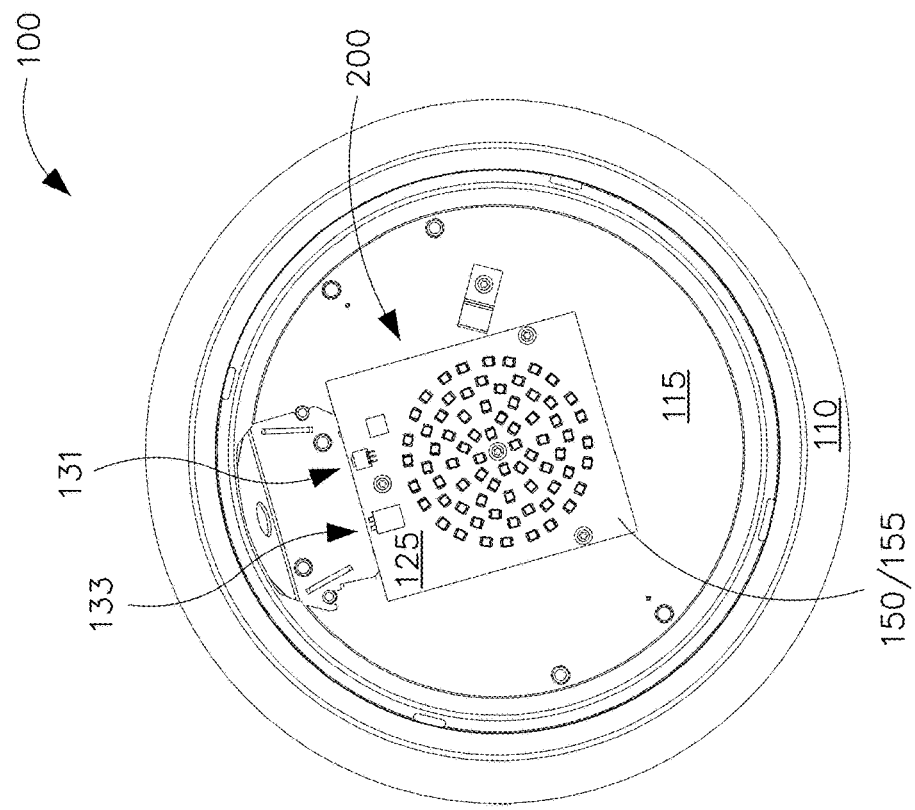
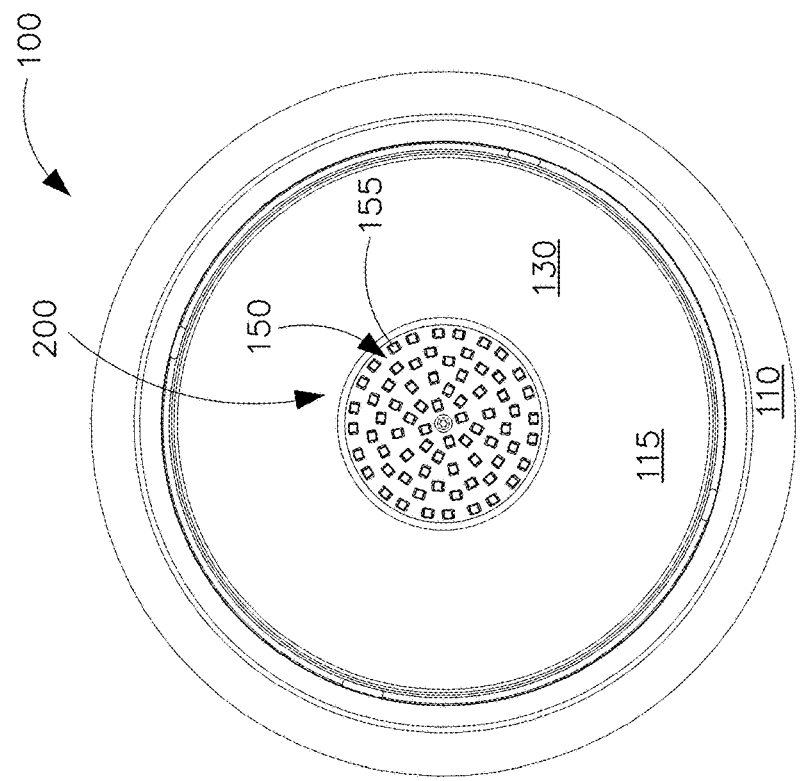
FIG. 1E
FIG. 1D

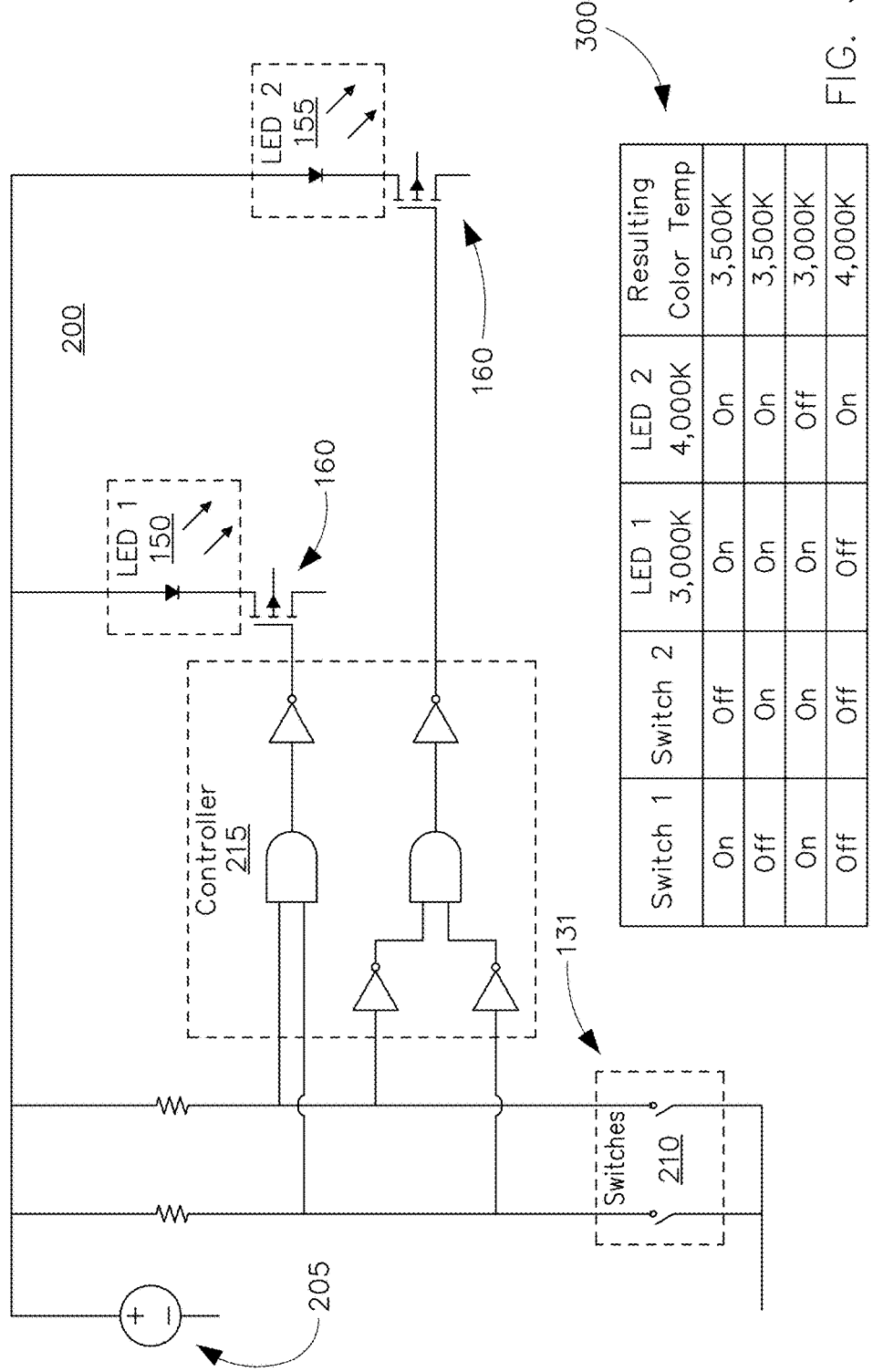

US 10,506,682 B2

CONFIGURABLE LIGHTING SYSTEM

CROSS REFERENCE TO RELATED APPLICATIONS

This application is a continuation application of and claims priority under 35 U.S.C. § 120 to U.S. patent application Ser. No. 15/727,833, titled "Configurable Lighting System" and filed on Oct. 9, 2017, which is a continuation-in-part of and claims priority to U.S. patent application Ser. No. 15/435,141, titled "Configurable Lighting System" and filed on Feb. 16, 2017, which claims priority to U.S. Provisional Patent Application No. 62/297,424 filed Feb. 19, 2016, in the name of Steven Walter Pyshos and Raymond Janik and entitled "Configurable Lighting System". The entire contents of these aforementioned applications are hereby incorporated herein by reference.

TECHNICAL FIELD

Embodiments of the technology relate generally to lighting systems and more specifically to lighting systems that can be readily configured to produce illumination of different color temperatures.

BACKGROUND

For illumination applications, light emitting diodes (LEDs) offer substantial potential benefit associated with their energy efficiency, light quality, and compact size. However, to realize the full potential benefits offered by light emitting diodes, new technologies are needed.

With luminaires that incorporate incandescent or fluorescent technology, some flexibility can be obtained by swapping lamps to meet user preferences. In such luminaires, lamp selection can provide flexibility in terms of correlated color temperature (CCT or color temperature) and light output (lumen output). For example, a compact fluorescent downlight might accept 6-, 32-, and 42-watt lamps in 2700, 3000, and 3500 K CCT. Additionally, changing lamp position and focal point in a reflector of an incandescent or fluorescent fixture can change the fixture spacing criteria (SC) of a luminaire.

In contrast, conventional light-emitting-diode-based luminaires typically offer reduced flexibility when the luminaire's light-emitting-diode-based light source is permanently attached to the luminaire. Stocking conventional light-emitting-diode-based luminaires at distribution to accommodate multiple configurations that users may desire can entail maintaining a relatively large or cumbersome inventory.

Need is apparent for a technology to provide a light emitting diode system that can adapt to various applications, for example by delivering multiple color temperatures, multiple lumens, and/or multiple photometric distributions. Need further exists for a capability to enable a single luminaire to be stocked at distribution and then quickly configured according to application parameters and deployment dictates. Need further exists for luminaires that are both energy efficient and flexible. A capability addressing one or more such needs, or some other related deficiency in the art, would support improved illumination systems and more widespread utilization of light emitting diodes in lighting applications.

SUMMARY

In some aspects of the disclosure, a system can configure a luminaire for providing illumination of a selected color temperature, a selected lumen output, or a selected photometric distribution based on an input. The input may be field selectable or may be selectable at a distribution center or at a late stage of luminaire manufacture, for example.

In some aspects of the disclosure, the luminaire can comprise at least two light sources having different color temperatures. In a first configuration, the luminaire can produce illumination of a first color temperature using a first one of the light sources. In a second configuration, the luminaire can produce illumination of a second color temperature using a second one of the light sources. In a third configuration, the luminaire can produce illumination of a third color temperature using both of the first and second the light sources. The third color temperature may be between the first and second color temperatures. The value of the third color temperature within a range between the first and second color temperatures can be controlled by manipulating the relative amounts of light output by the first and second light sources. That is, adjusting the lumen outputs of the first and second light sources can define the color temperature of the illumination produced by the luminaire in the third configuration.

In some aspects of the disclosure, the luminaire can comprise at least two light sources having different lumen outputs. In a first configuration, the luminaire can produce illumination of a first lumen output using a first one of the light sources. In a second configuration, the luminaire can produce illumination of a second lumen output using a second one of the light sources. In a third configuration, the luminaire can produce illumination of a third lumen output using both of the first and second light sources.

In some aspects of the disclosure, the luminaire can comprise at least two light sources having different photometric distributions. In a first configuration, the luminaire can produce illumination of a first photometric distribution using a first one of the light sources. In a second configuration, the luminaire can produce illumination of a second photometric distribution using a second one of the light sources. In a third configuration, the luminaire can produce illumination of a third photometric distribution using both of the first and second light sources.

In some aspects of the disclosure, a circuit and an associated input to the circuit can configure a luminaire for providing illumination having a selected property, for example a selected color temperature, a selected lumen output, or a selected photometric distribution. The input can be settable to a first number of states. The circuit can map the first number of states into a second number of states that is less than the first number of states. For example, the input can have four states and the circuit can map these four states into three states. The three states can correspond to three different values of the illumination property, for example three different color temperatures, three different lumen outputs, or three different photometric distributions.

The foregoing discussion of controlling illumination is for illustrative purposes only. Various aspects of the present disclosure may be more clearly understood and appreciated from a review of the following text and by reference to the associated drawings and the claims that follow. Other aspects, systems, methods, features, advantages, and objects of the present disclosure will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE DRAWINGS

FIGS. 1A, 1B, 1C, 1D, 1E, 1F, 1G, 1H, 1I, 1J, and 1K (collectively FIG. 1) illustrate views of a luminaire in accordance with some example embodiments of the disclosure.

FIG. 2 illustrates a functional block diagram of a circuit that a luminaire can comprise in accordance with some example embodiments of the disclosure.

FIG. 3 illustrates a state table for a circuit that a luminaire can comprise in accordance with some example embodiments of the disclosure.

Figure 1A:
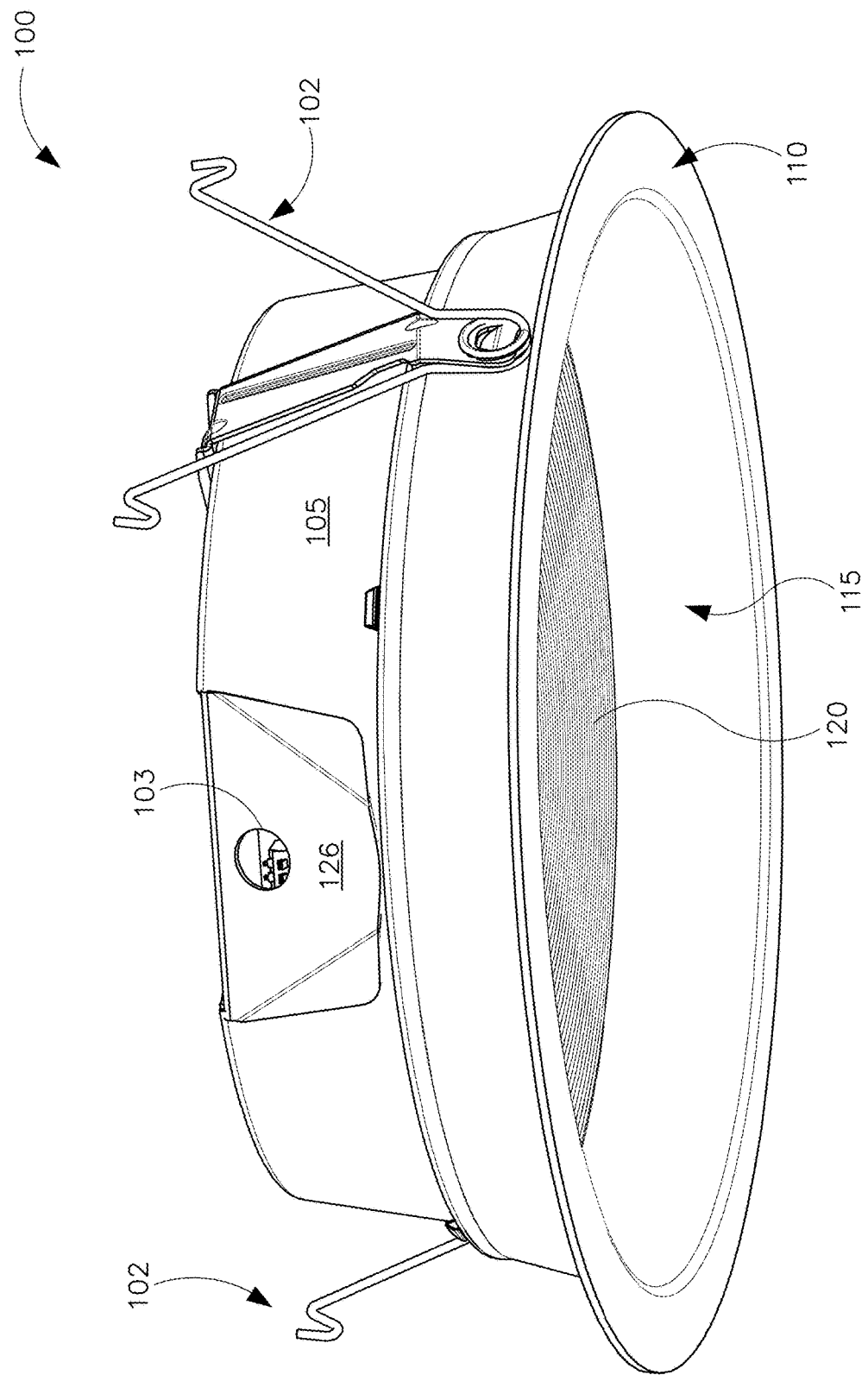

Many aspects of the disclosure can be better understood with reference to the above drawings. The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

In some example embodiments of the disclosure, a luminaire can comprise multiple groups of light emitting diodes of different color temperatures and a constant current power supply for powering the light emitting diodes. The power supply can utilize a switching scheme that can turn each group of light emitting diodes on and off to change the color temperature of the luminaire. In some example embodiments, the power supply can further vary the relative intensities of the light emitting diodes to manipulate the color temperature of the luminaire within a range.

For example, the luminaire can comprise a 3,000 K group of light emitting diodes and a 4,000 K group of light emitting diodes. When only the 3,000 K group is on, the luminaire can deliver 3,000 K illumination. When only the 4,000 K group is on, the luminaire can deliver 4,000 K illumination. When the 3,000 K group and the 4,000 K group are both on, the luminaire can deliver 3,500 K illumination. If the 4,000 K group of light emitting diodes is concurrently operated at a low lumen output and the 3,000 K group is operated at a high lumen output, the luminaire may deliver illumination of another selected color temperature, for example 3,100 K.

In some example embodiments, a controller can adjust lumen output automatically to maintain constant delivered lumens across multiple color temperatures or to suit application requirements. The controller implements the adjustment utilizing programmable driver current and/or via turning on and off various groups of light emitting diodes. Configurable color temperature or lumen output can function in combination with integral dimming, for example to facilitate interface with building automation, sensors, and dimmers.

In some example embodiments, luminaires can achieve an additional level of flexible configuration at a distribution center using interchangeable optics. For example, primary optics can provide medium distribution (e.g. spacing criteria equals 1.0), while a diffuser or concentrator lens can be used to achieve wide distribution (e.g. spacing criteria equals 1.4), and narrow distribution (e.g. spacing criteria equals 0.4).

In some example embodiments, a luminaire's configuration of delivered lumens and color temperatures can be set at the factory, at distribution, or in the field. To meet current and emerging code compliance, performance markings on a luminaire can indicate and correspond to the desired setting. Economical, field-installed nameplates can identify the various electrical and optical performance ratings and, when installed, permanently program the delivered lumens and color temperature. Other settings, such as dimming protocols, can likewise be configured. The interface between the nameplate and internal logic can use mechanical, electrical or optical means, for example.

Accordingly, in some embodiments of the disclosure, the technology provides product markings and supports regulatory compliance. For example, nameplates can indicate energy codes and rebate opportunities, for compliance with product labeling and to facilitate compliance confirmation by local authorities who may have jurisdiction. Further, luminaires that include example switches can be subject to meeting certain standards and/or requirements. For example, Underwriters Laboratories (UL), the National Electric Code (NEC), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to luminaires. Use of example embodiments described herein meet (and/or allow a corresponding luminaire to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of configurable lighting systems will be described more fully hereinafter with reference to the accompanying drawings, in which example embodiments of configurable lighting systems are shown. Configurable lighting systems may, however, be embodied in many different forms and should not be construed as limited to the example embodiments set forth herein. Rather, these example embodiments are provided so that this disclosure will be thorough and complete, and will fully convey the scope of configurable lighting systems to those of ordinary skill in the art. Like, but not necessarily the same, elements (also sometimes called components) in the various figures are denoted by like reference numerals for consistency.

Terms such as "first", "second", "third", "fourth", "fifth", "top", "bottom", "side", and "within" are used merely to distinguish one component (or part of a component or state of a component) from another. Such terms are not meant to denote a preference or a particular orientation, and are not meant to limit embodiments of configurable lighting systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Referring now to FIG. 1, multiple views of the luminaire 100 are shown. FIG. 1A illustrates a side perspective view of the luminaire 100. FIG. 1B illustrates a top perspective view of the luminaire 100. FIG. 1C illustrates a view of the light-emitting bottom of the luminaire 100, showing a lens 120 in a light-emitting aperture 115 of the luminaire 100. FIG. 1D illustrates a view of the light-emitting bottom of the luminaire 100 with the lens 120 removed from the light-emitting aperture 115 of the luminaire. FIG. 1E illustrates a view of the light-emitting bottom of the luminaire 100 with the lens 120 and an associated reflector 130 removed from the light-emitting aperture 115 of the luminaire. FIG. 1F illustrates a cutaway perspective view of the luminaire 100. FIG. 1G illustrates another cutaway perspective view of the luminaire 100. FIG. 1H illustrates another cutaway view of the luminaire 100. FIGS. 1I, 1J, and 1K provide detailed views of a portion of the luminaire 100 comprising a cover 126 and an associated access aperture 129 for providing internal access to the luminaire 100. In FIG. 1I, the cover 126 is fully removed. In FIG. 1J, the cover 126 is positioned adjacent the access aperture 129, for example in connection with attachment or removal of the cover 126. In FIG. 1K, the cover 126 is attached to the luminaire 100.

Figure 1B:
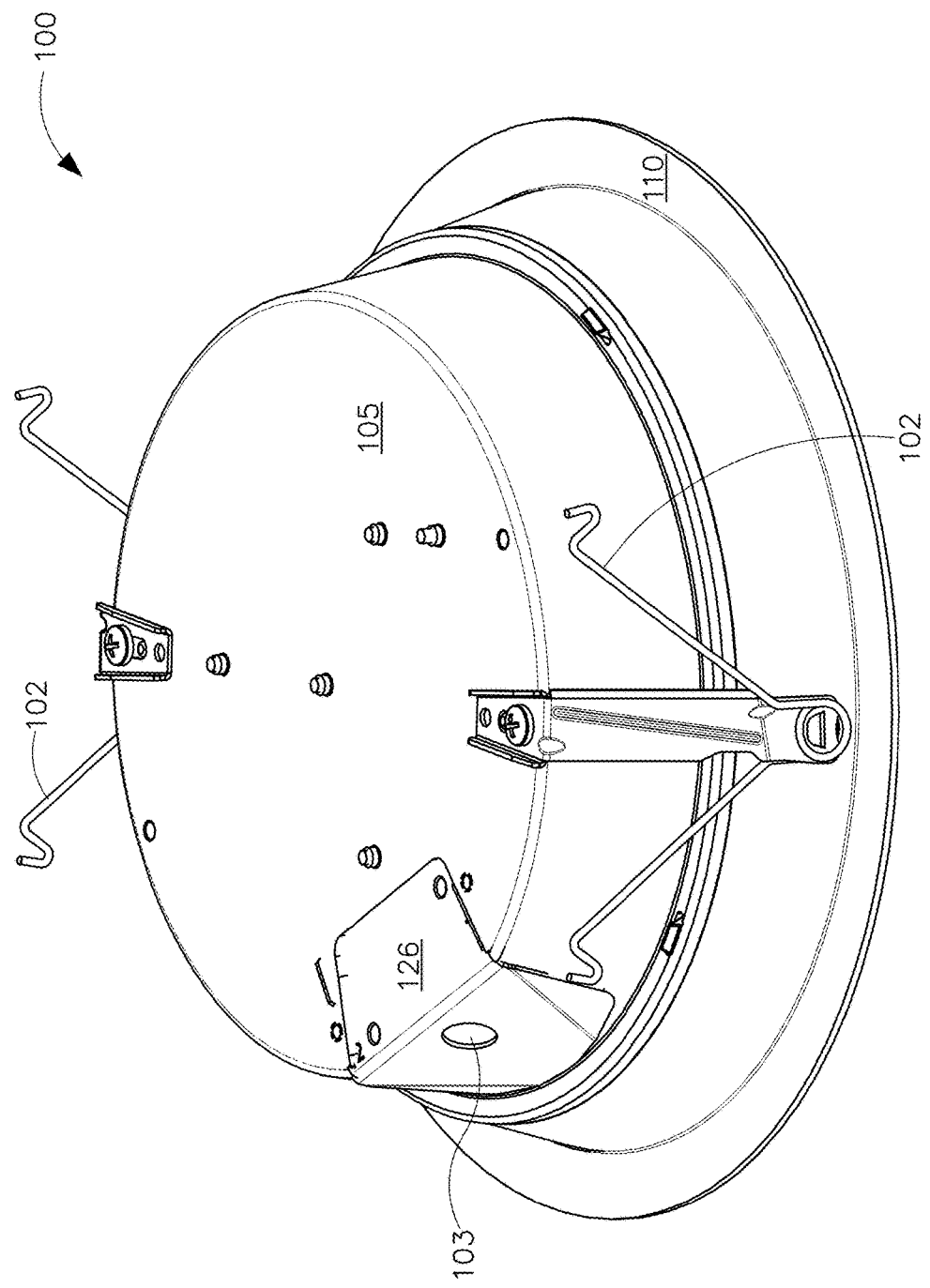
Figure 1C:
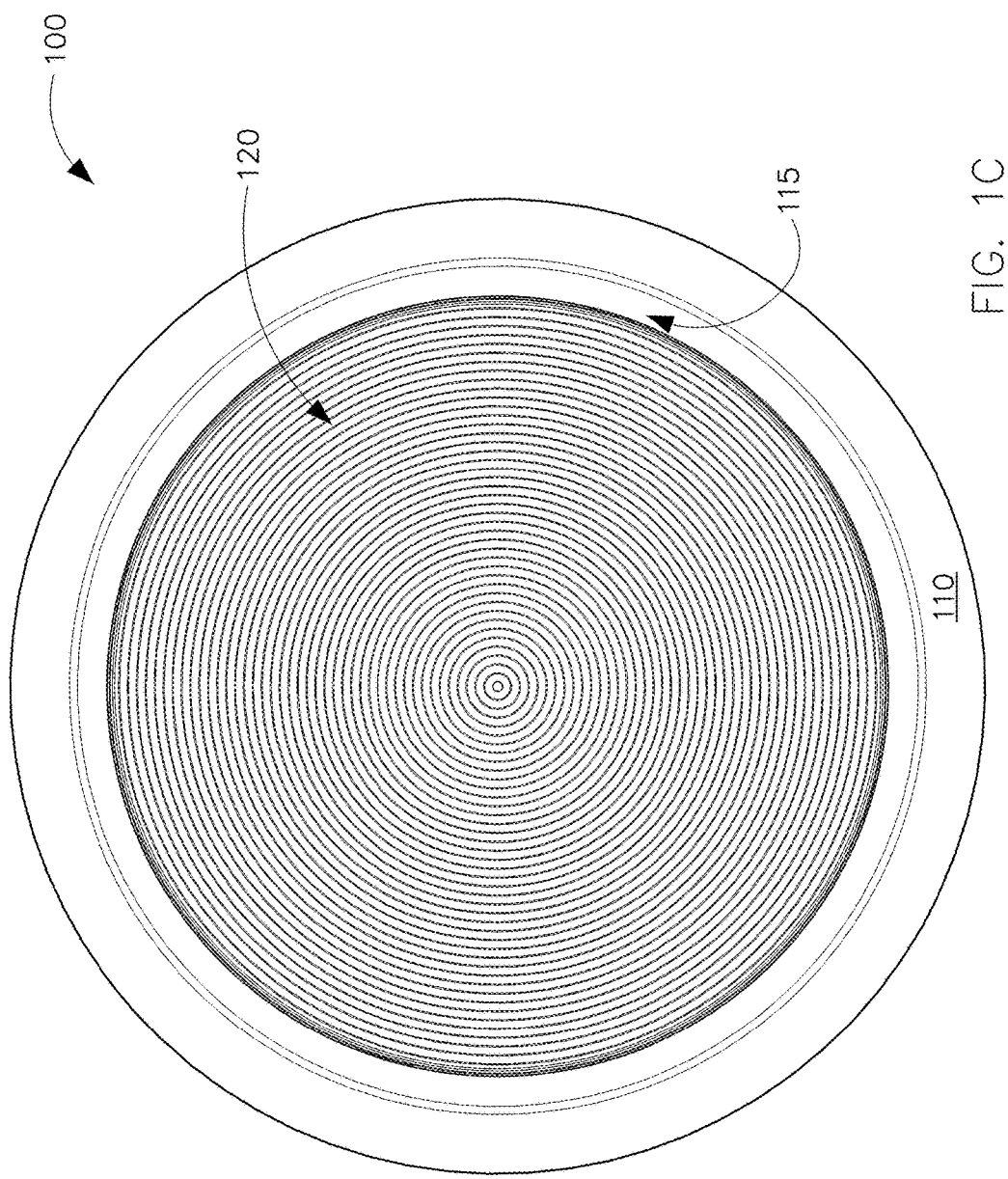
Figure 1F:
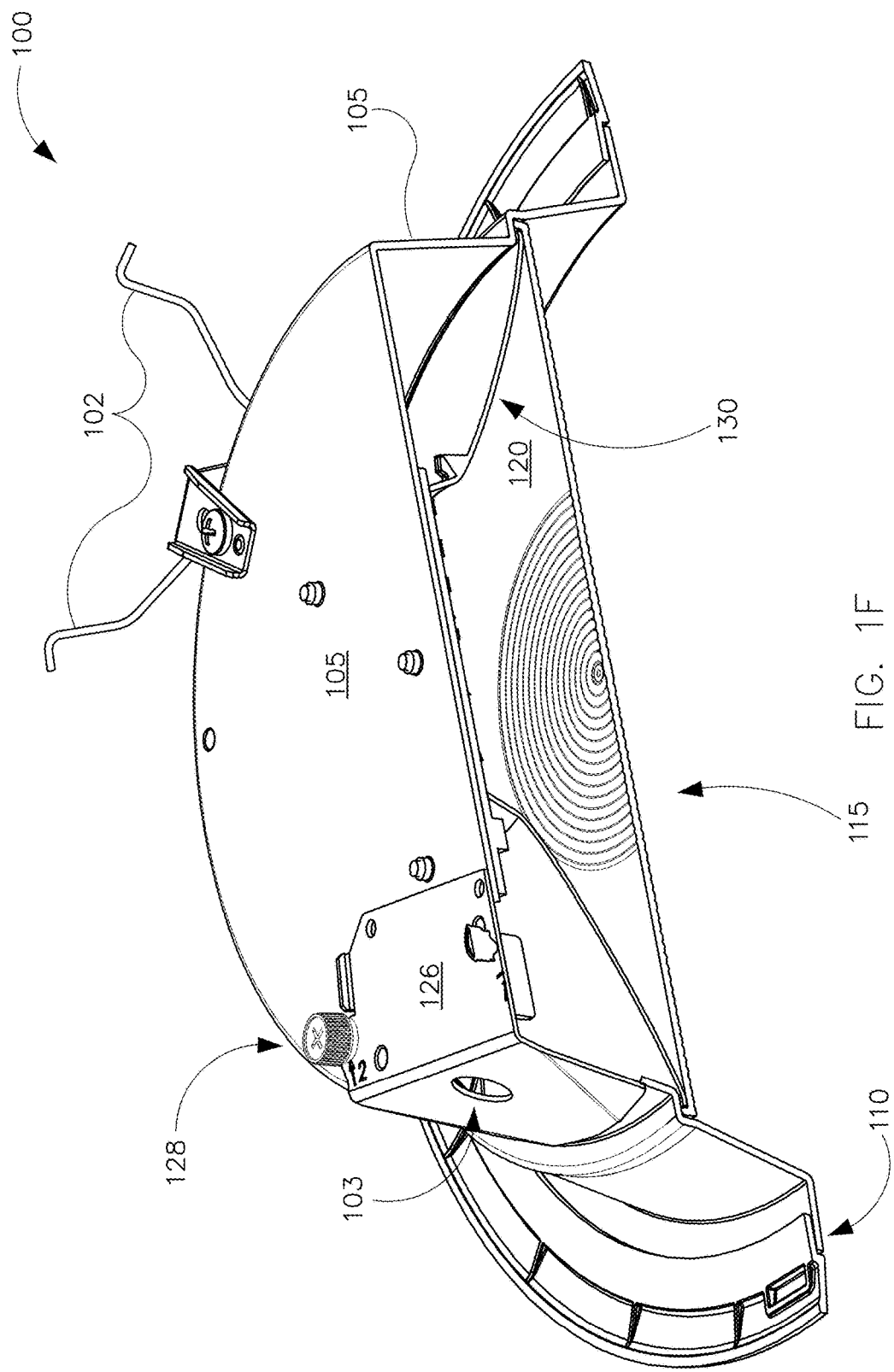
Figure 1G:
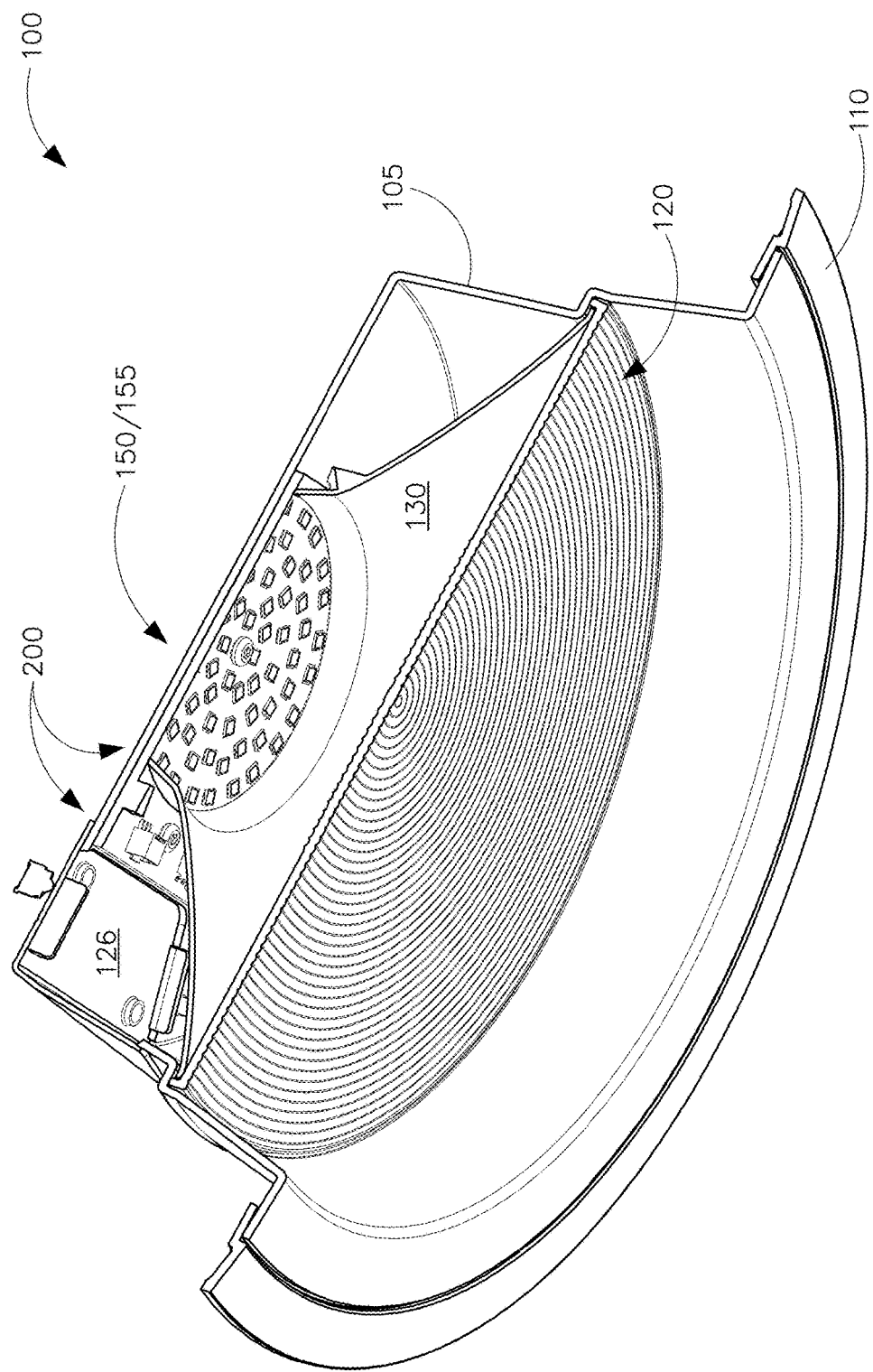
Figure 1H:
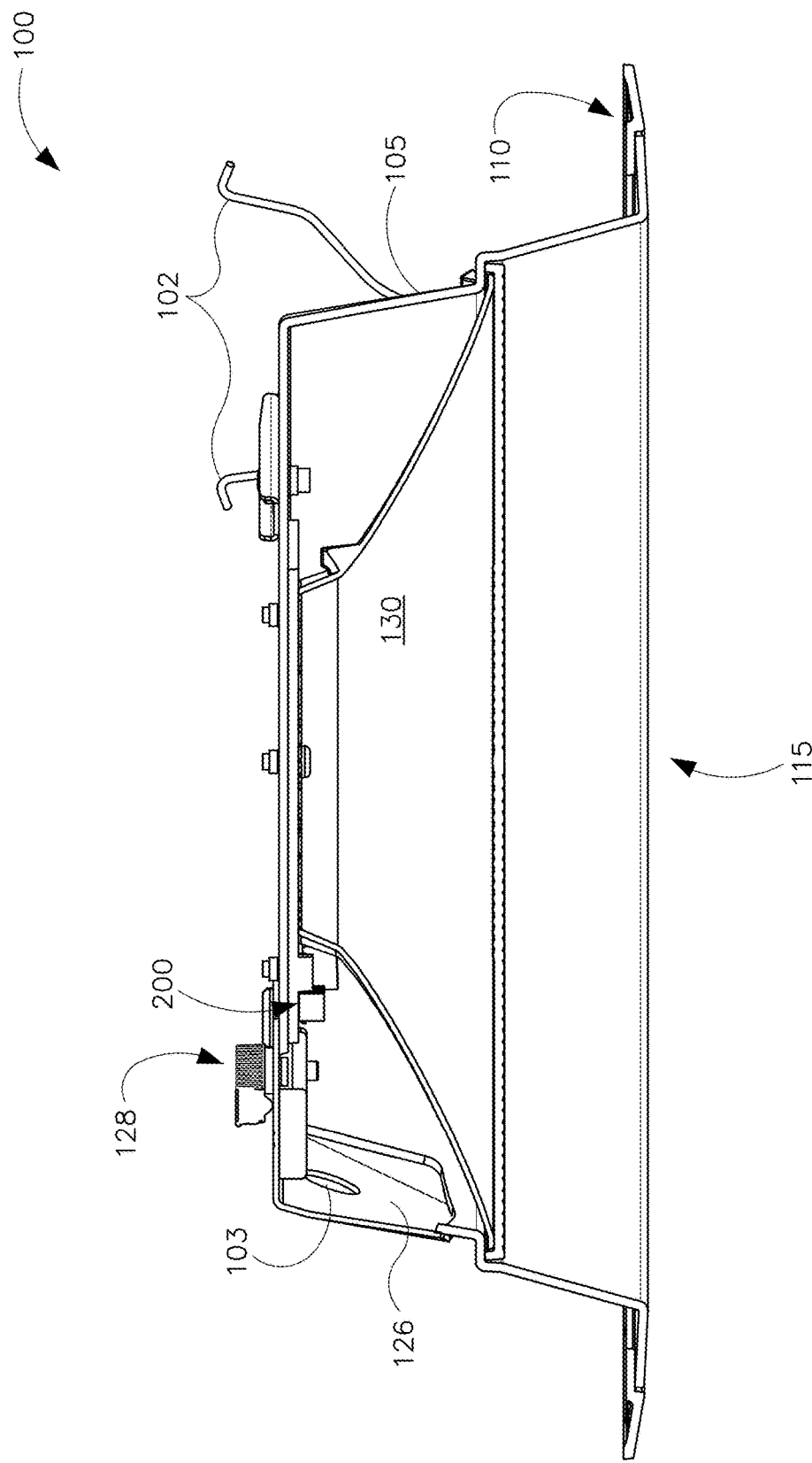

As best seen in the views of FIGS. 1A and 1B, the illustrated example luminaire 100 is suited for inserting in an aperture in a ceiling to provide overhead lighting. In this example embodiment, the luminaire 100 can be characterized as an overhead light or a recessed ceiling light. Various other indoor and outdoor luminaires that may be mounted in a wide range of orientations can be substituted for the luminaire 100 illustrated in FIG. 1.

The illustrated example luminaire 100 of FIG. 1 comprises a housing 105 that is circular with a protruding trim 110 that extends circumferentially about the housing 105. When the luminaire 100 is installed in a ceiling aperture, the rim 100 circumscribes and covers the edge of the ceiling aperture for aesthetics, for support, and for blocking of debris from above the ceiling. Hanger clips 102 hold the luminaire 100 in place in installation.

Figure 1J:
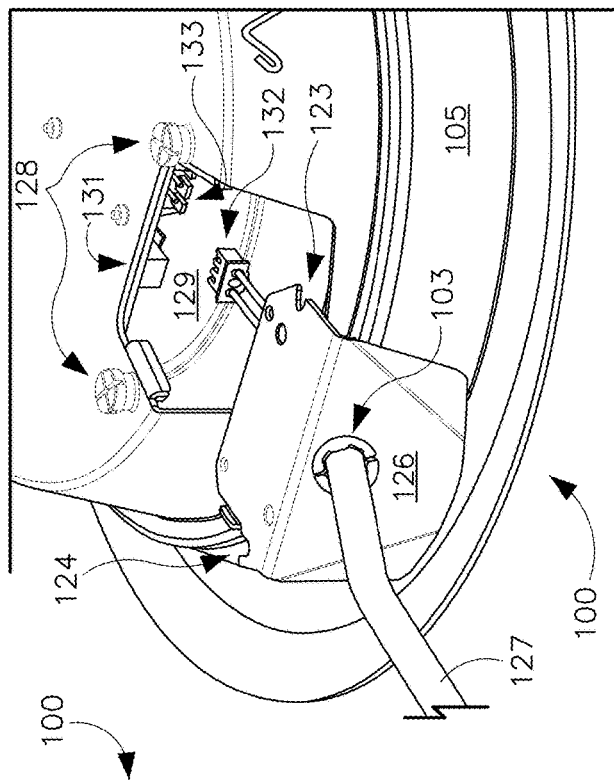
Figure 1I:
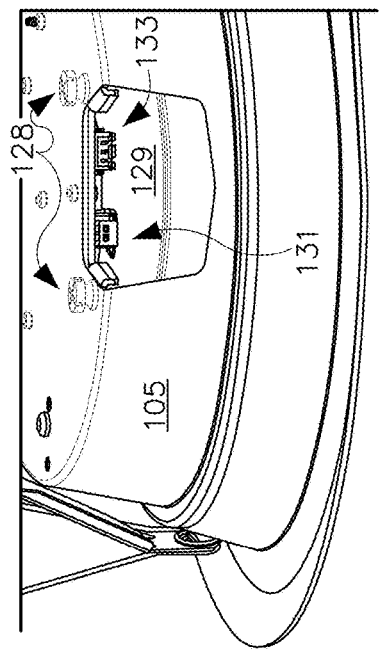
Figure 1K:
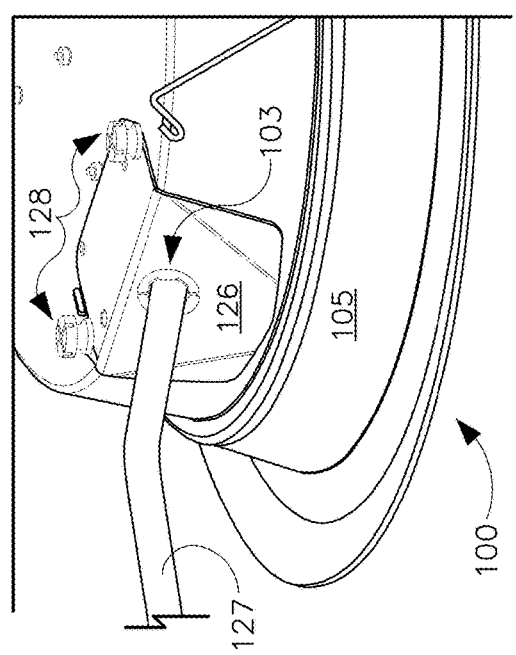

As best illustrated in FIGS. 1I, 1J, and 1K, the example luminaire 100 comprises an access aperture 129 and an associated cover 126. The access aperture 129 provides access to the interior of the luminaire housing 105, for example in the field and/or during luminaire installation. An installer can remove the cover 126 and manually set a dual inline pin (DIP) switch 131 to configure the luminaire 100 for long-term operation providing illumination with a selected color temperature, a selected lumen output, and/or a selected photometric distribution. As illustrated, the dual inline pin switch 131 is mounted on a circuit board adjacent the access aperture 129, thereby facilitating convenient and efficient access in the field or at a distribution center, for example.

An electrical cable 127 extends through a wiring aperture 103 in the cover 126. The electrical cable 127 terminates in a plug 132 that mates with a receptacle 133 that is mounted inside the housing 105 adjacent the access aperture 129 for convenient field access.

As illustrated, the example cover 126 comprises two notches 123, 124 that each receives a respective screw 128 for holding the cover 126 in place. The notch 123 is disposed on the right side of the cover 126 and is sized to receive one of the screws 128. Meanwhile, the notch 124 is disposed on a left side of the cover 126 and is sized to receive the other screw 128.

The left notch 124 and the right notch 123 are oriented so that the cover 126 is rotatable about the right screw 128 when the right screw 128 is loosely disposed in the right notch 123. In other words, cover rotation can occur when the right screw 128 is in the right notch 123 with threads engaged but prior to tightening. In this position, the cover 126 can rotate clockwise about the right screw 128. Thus, the right screw 128 provides an axis of rotation for the cover 126. This clockwise rotation facilitates convenient manipulation of the cover 126 by a person working the cover 126 to cover the access aperture 129, with the screws 128 engaged but not fully tightened. The clockwise rotation of the cover 126 about the right screw 128 provides the person with a capability to slide the left notch 124 of the cover 126 conveniently under the head of the left screw 128. Once the cover 126 is rotated so the left notch 124 is under the head of the left screw 128, the person (for example an installer) can tighten the two screws 128 to secure the cover 126.

To remove the cover 126, the person loosens the two screws 128 and then rotates the cover 126 counterclockwise about the right screw 128 so that the left notch 124 moves out from under the head of the left screw 128. Once the left notch 124 is free from the left screw 128, the installer can pull the right notch 123 out from under the right screw 128 to fully remove the cover 126.

As best seen in the views of FIGS. 1A, 1C, 1F, and 1G, the lens 120 of the luminaire 100 is positioned adjacent the lower, exit side of the light-emitting aperture 115. As illustrated, the lens 120 can mix and blend light emitted by two groups of light emitting diodes 150, 155, with each group having a different color temperature. In some embodiments, the two groups of light emitting diodes 150, 155 may have color temperatures that differ by at least 500 Kelvin, for example. The group of light emitting diodes 150 can be characterized as one light emitting diode light source, while the group of light emitting diodes 155 can be characterized as another light emitting diode light source. Other embodiments of a light emitting diode light source may have a single light emitting diode or more light emitting diodes than the embodiment illustrated in FIG. 1. A reflector 130 is disposed in and lines the aperture 115 to guide and manage the emitted light between the light emitting diodes 150, 155 and the lens 120. In some embodiments, an upper lens (not illustrated) replaces the reflector 130.

The light emitting diodes 150, 155 are mounted on a substrate 125, for example a circuit board, and form part of a circuit 200. In the illustrated embodiment, the light emitting diodes 150, 155 are interspersed. In other embodiments, the light emitting diodes 150, 155 may be separated from one another or spatially segregated according to color temperature or other appropriate parameter. As discussed in further detail below, the circuit 200 supplies electricity to the light emitting diodes 150, 155 with a level of flexibility that facilitates multiple configurations suited to different applications and installation parameters.

Figure 4:
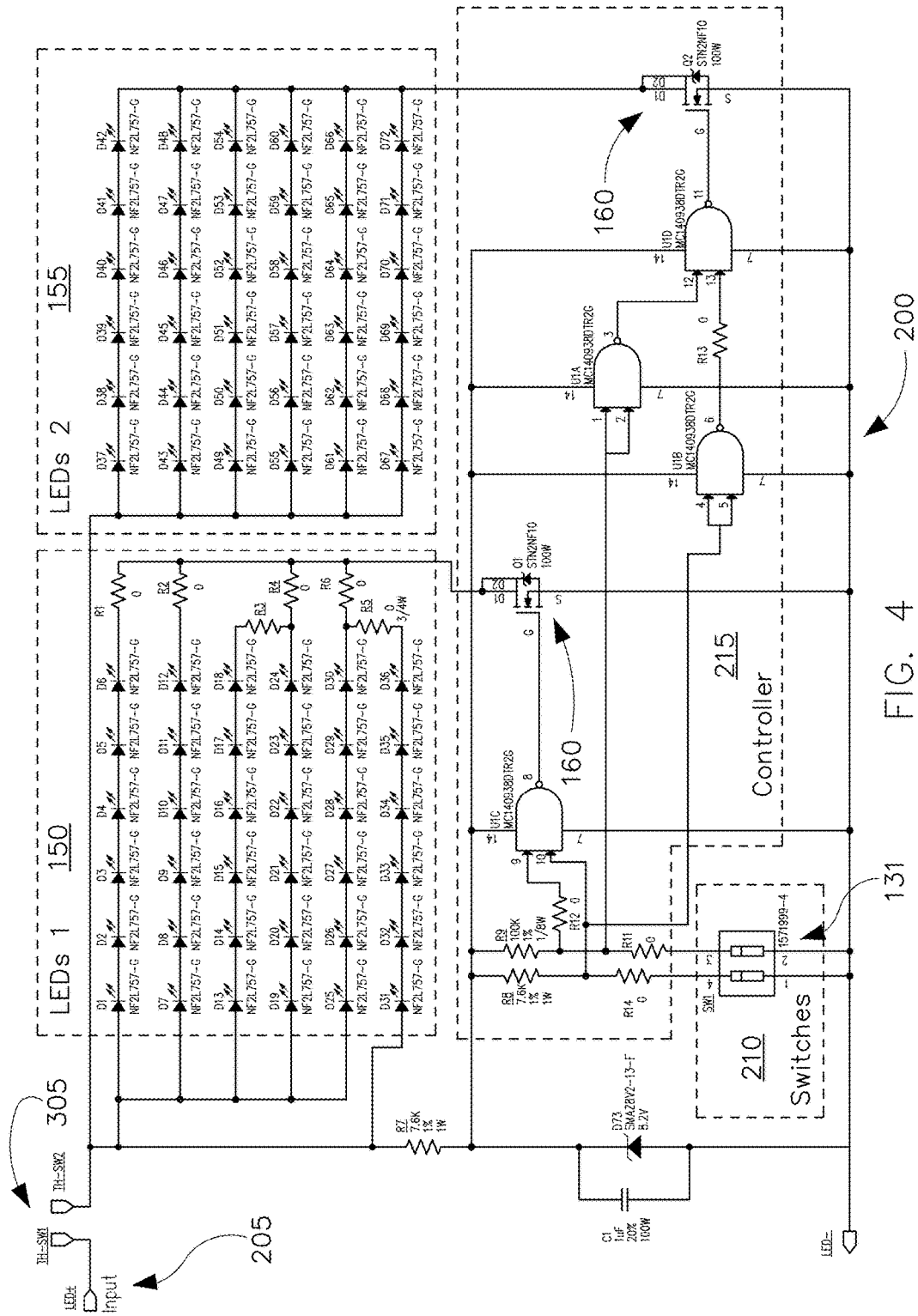
FIG. 4 illustrates a schematic of a circuit that a luminaire can comprise in accordance with some example embodiments of the disclosure.

Turning to FIGS. 2, 3, and 4, some example embodiments of the circuit 200 will be discussed in further detail with example reference to the luminaire 100. The circuit 200 can be applied to other indoor and outdoor luminaires.

Referring now to FIG. 2, this figure illustrates an embodiment of the circuit 200 in an example block diagram form. The circuit 200 comprises a DC power supply 205 for supplying electrical energy that the circuit 200 delivers to the light emitting diodes 150, 155. In an example embodiment, the circuit 200 comprises a light emitting diode driver.

The dual inline pin switch 131 comprises individual switches 210 that provide an input for configuring the luminaire 100 to operate at a selected color temperature. In the illustrated embodiment, the circuit 200 comprises two manual switches 210. Other embodiments may have fewer or more switches 210. In various embodiments, the switches 210 can be mounted to the housing 105 of the luminaire 100, for example within the housing 105 (as illustrated in FIG. 1 and discussed above) or on an exterior surface of the housing 105. In some embodiments, the switches 210 are mounted on the substrate 125. In some embodiments, the switches 210 are implemented via firmware or may be solid state.

As an alternative to the illustrated dual inline pin switch 131, the input can comprise multiple DIP switches, one or more single in-line pin packages (SIP or SIPP), one or more rocker switches, one or more reed switches, one or more magnetic switches, one or more rotary switches, one or more rotary dials, one or more selectors or selector switches, one or more slide switches, one or more snap switches, one or more thumbwheels, one or more toggles or toggle switches, one or more keys or keypads, or one or more buttons or pushbuttons, to mention a few representative examples without limitation.

As further discussed below, a controller 215 operates the light emitting diodes 150, 155 according to state of the switches 210. In some example embodiments, the controller 215 comprises logic implemented in digital circuitry, for example discrete digital components or integrated circuitry. In some example embodiments, the controller 215 utilizes microprocessor-implemented logic with instructions stored in firmware or other static or non-transitory memory.

In the illustrated embodiment, the outputs of the controller 215 are connected to two metal-oxide-semiconductor field-effect transistors (MOSFETs) 160 to control electrical flow through two light emitting diodes 150, 155. The illustrated MOSFETs 160 provide one example and can be replaced with other appropriate current control devices or circuits in various embodiments. The switches 210 thus configure the luminaire 100 to operate with either or both of the light emitting diodes 150, 155. The light emitting diodes 150, 155 illustrated in FIG. 2 may represent two single light emitting diodes or two groups of light emitting diodes, for example.

FIG. 3 illustrates a representative table 300 describing operation of the circuit 100 according to some example embodiments. In the example of FIG. 3, the light emitting diode 150 produces light having a color temperature of 3,000 Kelvin, and the light emitting diode 155 produces light having a color temperature of 4,000 Kelvin.

As shown in the example table 300, when both of the switches 210 are in the on state, the controller 215 causes the light emitting diode 155 to be off and the light emitting diode 150 to be on. Accordingly, the luminaire 100 emits illumination having a color temperature of 3,000 Kelvin.

When both of the switches 210 are in the off state, the controller 215 causes the light emitting diode 155 to be on and the light emitting diode 150 to be off. Accordingly, the luminaire 100 emits illumination having a color temperature of 4,000 Kelvin.

When one of the switches 210 is in the off state and the other of the switches 210 is on the on state, the controller 215 causes the light emitting diode 155 to be on and the light emitting diode 150 to be on. The luminaire 100 thus emits illumination having a color temperature of 3,500 Kelvin. In some other example embodiments, the controller 215 can adjust the light output of one or both of the light emitting diodes 150, 155 to set the color temperature to a specific value with the range of 3,000 to 4,000 Kelvin.

Accordingly, the controller 215 maps the four configurations of the two switches 210 to three states for configuring the two light emitting diodes 150, 155 for permanent or long-term operation. Mapping two switch configurations to a single mode of long-term operation can simplify configuration instructions and reduce errors during field configuration. The resulting configurations support multiple color temperatures of illumination from a single luminaire 100.

Some example embodiments support fewer or more than three states of illumination. For example, in one embodiment, the luminaire 100 comprises three strings of light emitting diodes 150 that have different color temperatures, such as 3,000 Kelvin, 2,700 Kelvin, and 4,000 Kelvin. In this example, in addition to the states illustrated in FIG. 3 and discussed above, the switching logic can support a fourth state in which only the 2,700 Kelvin string is on.

FIG. 4 illustrates a schematic of an example embodiment of the circuit 200. The schematic of FIG. 4 provides one example implementation of the block diagram illustrated in FIG. 3.

As illustrated in FIG. 4 in schematic form, the circuit 200 conforms to the foregoing discussion of the block diagram format of FIG. 3. In FIG. 4, the light emitting diodes 150, 155 of FIG. 3 are respectively represented with groups of light emitting diodes 150, 155. Additionally, the schematic details include a thermal protective switch 305 for guarding against overheating. FIG. 4 thus provides one example schematic for an embodiment of the electrical system of the luminaire 100 illustrated in FIG. 1 and discussed above.

Figure 5:
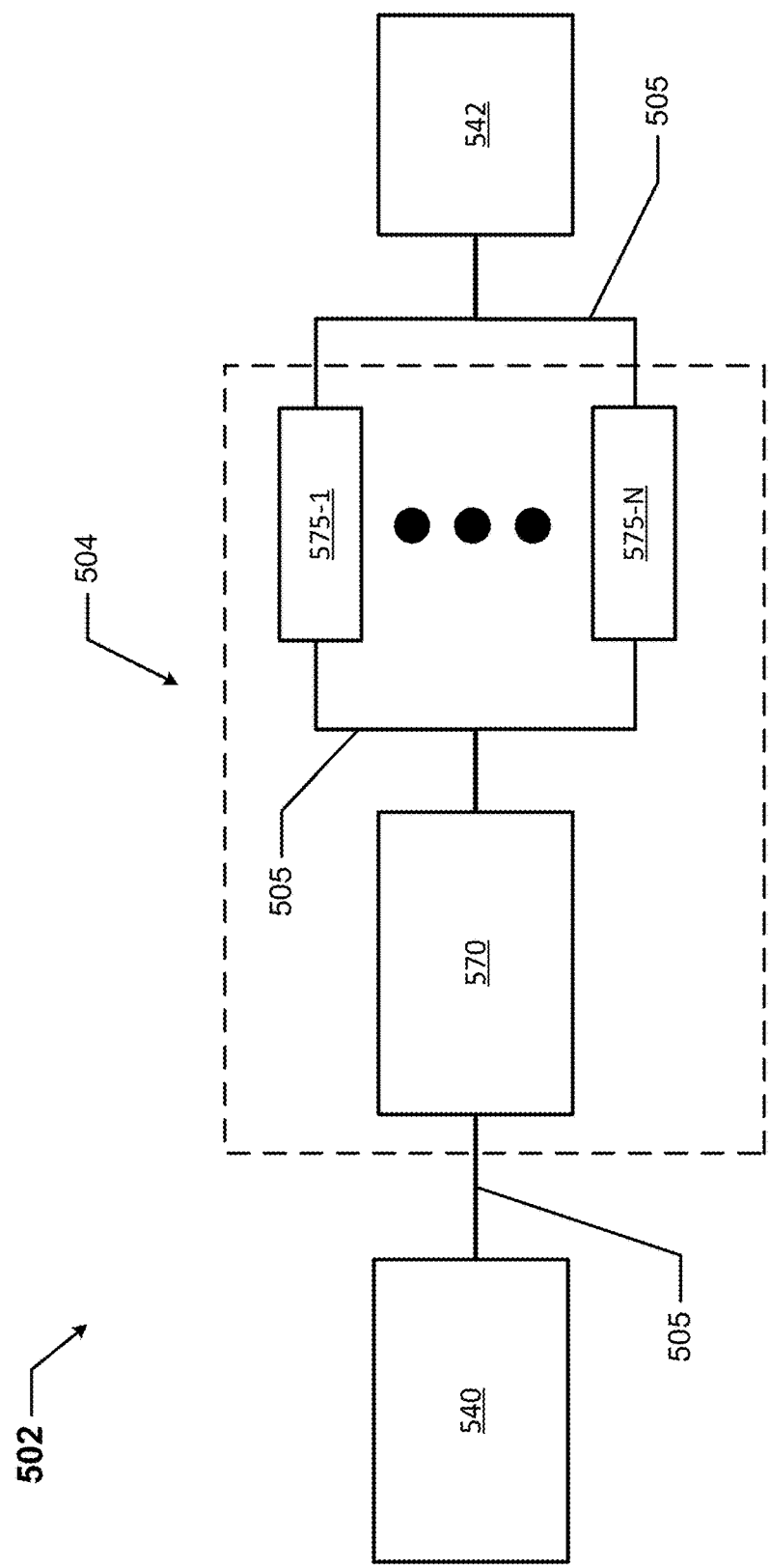
FIG. 5 shows a system diagram of a light fixture in accordance with certain example embodiments.

Example embodiments can also be used to control one or more other characteristics of the output of a light fixture, in addition to or aside from CCT. For instance, example embodiments can be used to control lumen output of a light fixture. FIG. 5 shows a system diagram of such a light fixture 502 in accordance with certain example embodiments. Referring to FIGS. 1A-5, the light fixture 502 of FIG. 5 includes a power supply 540, an example control module 504, and one or more light sources 542. The power supply 540 and the light sources 542 of FIG. 5 are described in more detail below with respect to the power supply 740 and the light sources 742 of FIG. 7A.

The example control module 504 can include one or more of a number of components. For example, as shown in FIG. 5, the control module 504 can include a switch 570 and multiple resistors 575 coupled in series with the switch 570 and in parallel with each other. In this case, there are N resistors 575 (e.g., resistor 575-1, resistor 575-N). The switch 570 can be a single switch or multiple switches. The switch 570 and the resistors 575 of FIG. 5 are described in more detail below with respect to the switch 770 and the resistors 775 of FIG. 7B. The communication links 505 between the power supply 540, the switch 570, the resistors 575, and the light sources 542 are also described in more detail below with respect to the communication links 505 of FIG. 7A.

Figure 6:
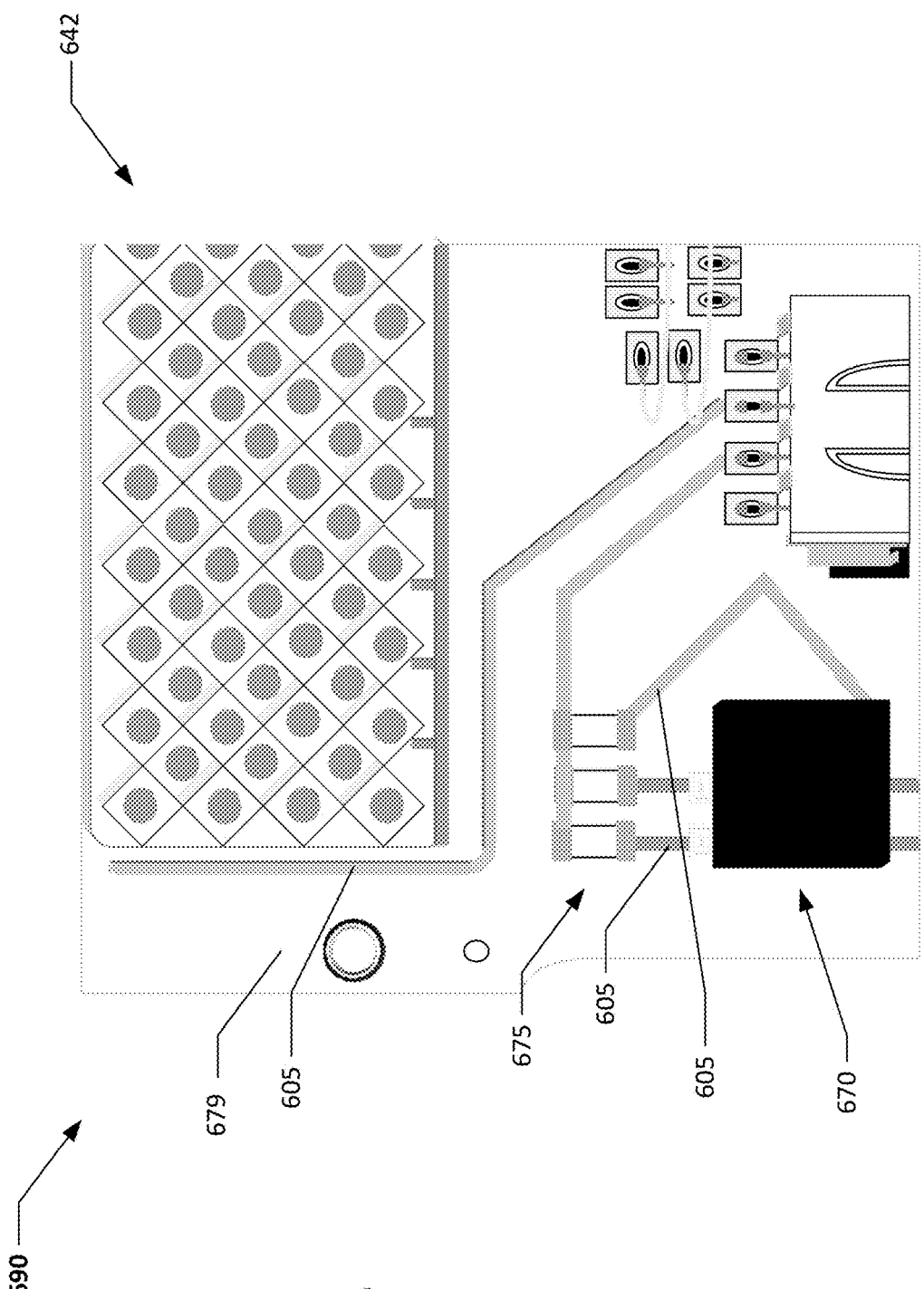
FIG. 6 shows a portion of a circuit board assembly of a light fixture with lumen control in accordance with certain example embodiments.

FIG. 6 shows a portion of a circuit board assembly 690 of a light fixture with lumen control in accordance with certain example embodiments. Referring to FIGS. 1A-6, the circuit board assembly 690 of FIG. 6 includes a circuit board 679 on which a number of discrete components are disposed. For example, in this case, the circuit board 679 has three resistors 675, a switch 670, a number of communication links 605 in the form of traces, and a number of light sources 642. As discussed above with respect to FIG. 5, the resistors 675, the switch 670, the communication links 605, and the light sources 642 of FIG. 6 are described in more detail below with respect to their counterparts of FIGS. 7A and 7B.

Figure 7A:
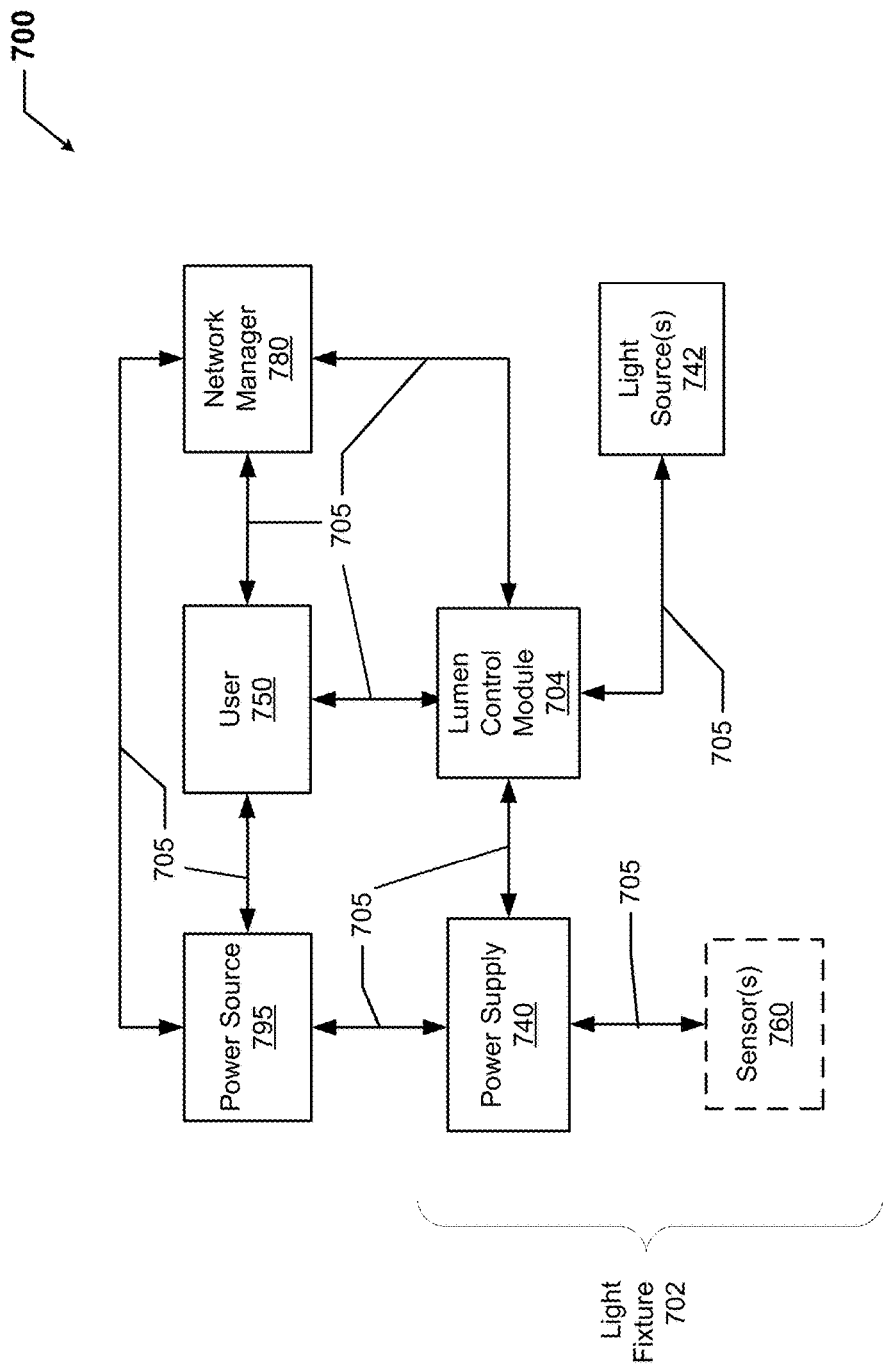
FIGS. 7A and 7B show a system that includes a light fixture and a lumen control module in accordance with certain example embodiments.
Figure 7B:
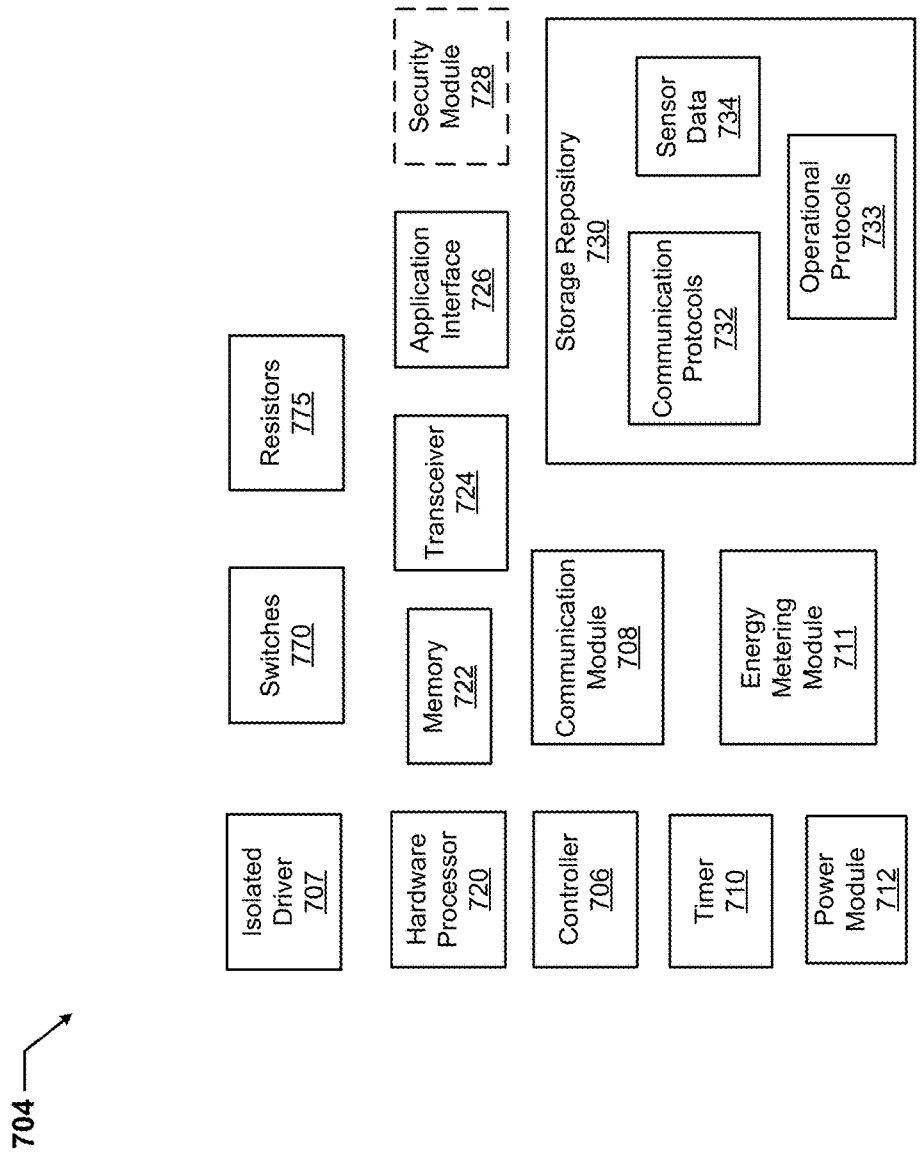

FIGS. 7A and 7B show a lighting system 700 that includes a light fixture 702 having a control module 704 in accordance with certain example embodiments. The lighting system 700 can include a power source 795, a user 750, a network manager 780, and the light fixture 702. In addition to the control module 704 (also sometimes called a lumen control module 704), the light fixture 702 can include a power supply 740, a number of light sources 742, and one or more optional sensors 760. The lumen control module 704 controls the amount of power (e.g., current) that is delivered to the light sources 742, thereby controlling the lumen output of the light sources 742. This function performed by the control module 704 can sometimes be referred to as current steering or current routing.

As shown in FIG. 7B, the control module 704 can include one or more of a number of components. Such components, can include, but are not limited to, a controller 706, an isolated driver 707, a communication module 708, a timer 710, an energy metering module 711, a power module 712, a storage repository 730, a hardware processor 720, a memory 722, a transceiver 724, an application interface 726, one or more switches 770, multiple resistors 775, and, optionally, a security module 728. The components shown in FIG. 7B are not exhaustive, and in some embodiments, one or more of the components shown in FIG. 7B may not be included in an example light fixture. Any component of the example light fixture 702 can be discrete or combined with one or more other components of the light fixture 702.

Referring to FIGS. 1-7B, a user 750 may be any person that interacts with light fixtures (e.g., light fixture 702) and/or example control modules (e.g., control module 704). Examples of a user 750 may include, but are not limited to, an engineer, an electrician, an instrumentation and controls technician, a mechanic, an operator, a property manager, a homeowner, a tenant, an employee, a consultant, a contractor, and a manufacturer's representative. The user 750 can use a user system (not shown), which may include a display (e.g., a GUI). The user 750 interacts with (e.g., sends data to, receives data from) the control module 704 of the light fixture 702 via the application interface 726 (described below). The user 750 can also interact with a network manager 780, the power source 795, and/or one or more of the sensors 760. Interaction between the user 750, the light fixture 702, the network manager 780, and the sensors 760 can be conducted using communication links 705.

Each communication link 705 can include wired (e.g., Class 1 electrical cables, Class 2 electrical cables, Ethernet cables, electrical connectors, electrical conductors and/or wireless (e.g., Wi-Fi, visible light communication, cellular networking, Bluetooth, Bluetooth Low Energy (BLE), Zigbee, WirelessHART, ISA100, Power Line Carrier, RS485, DALI) technology. For example, a communication link 705 can be (or include) a wireless link between the control module 704 and the user 750. The communication link 705 can transmit signals (e.g., power signals, communication signals, control signals, data) between the light fixture 702 and the user 750, the power source 795, the network manager 780, and/or one or more of the sensors 760.

The network manager 780 is a device or component that controls all or a portion (e.g., a communication network) of the system 700 that includes the control module 704 of the light fixture 702, the power source 795, the user 750, and the sensors 760. The network manager 780 can be substantially similar to the control module 704, or portions thereof, as described below. For example, the network manager 780 can include a controller. Alternatively, the network manager 780 can include one or more of a number of features in addition to, or altered from, the features of the control module 704 described below. As described herein, communication with the network manager 780 can include communicating with one or more other components (e.g., another light fixture) of the system 700. In such a case, the network manager 780 can facilitate such communication.

The power source 795 of the system 700 provides AC mains or some other form of power to the light fixture 702, as well as to one or more other components (e.g., the network manager 780) of the system 700. The power source 795 can include one or more of a number of components. Examples of such components can include, but are not limited to, an electrical conductor, a coupling feature (e.g., an electrical connector), a transformer, an inductor, a resistor, a capacitor, a diode, a transistor, and a fuse. The power source 795 can be, or include, for example, a wall outlet, an energy storage device (e.g. a battery, a supercapacitor), a circuit breaker, and/or an independent source of generation (e.g., a photovoltaic solar generation system). The power source 795 can also include one or more components (e.g., a switch, a relay, a controller) that allow the power source 795 to communicate with and/or follow instructions from the user 750, the control module 704, and/or the network manager 780.

The power source 795 can be coupled to the power supply 740 of the light fixture 702. In this case, the power source 795 includes one or more communication links 705 (e.g., electrical conductors), at the distal end of which can be disposed a coupling feature (e.g., an electrical connector). The power supply 740 of the light fixture 702 can also include one or more communication links 705 (e.g., electrical conductors, electrical connectors) that complement and couple to the power source 795. In this way, the AC mains provided by the power source 795 is delivered directly to the power supply 740 of the light fixture 702.

The one or more optional sensors 760 can be any type of sensing device that measure one or more parameters. Examples of types of sensors 760 can include, but are not limited to, a passive infrared sensor, a photocell, a differential pressure sensor, a humidity sensor, a pressure sensor, an air flow monitor, a gas detector, and a resistance temperature detector. Parameters that can be measured by a sensor 760 can include, but are not limited to, movement, occupancy, ambient light, infrared light, temperature within the light fixture housing, and ambient temperature. The parameters measured by the sensors 760 can be used by the controller 706 of the control module 704 and/or by one or more other components (e.g., the power supply 740) of the light fixture 702 to operate the light fixture 702.

The controller 706 of the control module 704 can be configured to communicate with (and in some cases control) the sensor 760. In some other cases, a sensor 760 can be part of the control module 704, where the controller 706 of the control module 704 can be configured to communicate with (and in some cases control) the sensor 760. As yet another alternative, a sensor 760 can be a new device that is added to the light fixture 702, where the controller 706 of the control module 704 is configured to communicate with (and in some cases control) the sensor 760. The controller 706 and a sensor 760 can be coupled to each other using communication links 705. Each sensor 760 can use one or more of a number of communication protocols 732 that are known and used by the control module 704.

The user 750, the network manager 780, the power source 795, and/or the sensors 760 can interact with the control module 704 of the light fixture 702 using the application interface 726 in accordance with one or more example embodiments. Specifically, the application interface 726 of the control module 704 receives data (e.g., information, communications, instructions, updates to firmware) from and sends data (e.g., information, communications, instructions) to the user 750, the network manager 780, the power source 795, and/or each sensor 760. The user 750, the network manager 780, the power source 795, and/or each sensor 760 can include an interface to receive data from and send data to the control module 704 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The control module 704, the user 750, the network manager 780, the power source 795, and/or the sensors 760 can use their own system or share a system in certain example embodiments. Such a system can be, or contain a form of, an Internet-based or an intranet-based computer system that is capable of communicating with various software. A computer system includes any type of computing device and/or communication device, including but not limited to the control module 704. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 8.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 700.

The light fixture 702 can include a light fixture housing. The light fixture housing can include at least one wall that forms a light fixture cavity. In some cases, the light fixture housing can be designed to comply with any applicable standards so that the light fixture 702 can be located in a particular environment. The light fixture housing can form any type of light fixture 702, including but not limited to a troffer light fixture, a down can light fixture, a recessed light fixture, and a pendant light fixture. The light fixture housing can also be used to combine the light fixture 702 with some other device, including but not limited to a ceiling fan, a smoke detector, a broken glass detector, a garage door opener, and a wall clock.

The light fixture housing of the light fixture 702 can be used to house or be located proximate to one or more components of the light fixture 702, including the control module 704 and one or more sensors 760. For example, the control module 704 (which in this case includes the controller 706, the isolated driver 707, the communication module 708, the timer 710, the energy metering module 711, the power module 712, the storage repository 730, the hardware processor 720, the memory 722, the transceiver 724, the application interface 726, the switches 770, and the optional security module 728) can be disposed within the cavity formed by the housing of the light fixture 702. In alternative embodiments, any one or more of these or other components (e.g., a sensor 760) of the light fixture 702 can be disposed on or remotely from the housing of the light fixture 702.

The control module 704 can include a housing (not shown in FIGS. 7A and 7B). Such a housing can include at least one wall that forms a cavity. One or more of the various components (e.g., controller 706, hardware processor 720) of the control module 704 can be disposed within the cavity formed by such a housing. Alternatively, a component of the control module 704 can be disposed on such a housing or can be located remotely from, but in communication with, such a housing. As yet another alternative, the control module 704 can be a number of discrete components that are disposed on a circuit board.

The storage repository 730 can be a persistent storage device (or set of devices) that stores software and data used to assist the control module 704 in communicating with the user 750, the network manager 780, the power source 795, and one or more sensors 760 within the system 700. In one or more example embodiments, the storage repository 730 stores one or more communication protocols 732, operational protocols 733, and sensor data 734. The communication protocols 732 can be any of a number of protocols that are used to send and/or receive data between the control module 704 and the user 750, the network manager 780, the power source 795, and one or more sensors 760. One or more of the communication protocols 732 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 732 can provide a layer of security to the data transferred within the system 700.

The operational protocols 733 can be any algorithms, formulas, logic steps, and/or other similar operational procedures that the controller 706 of the control module 704 follows based on certain conditions at a point in time. An example of an operational protocol 733 is directing the controller 706 to provide power and to cease providing power to the power supply 740 at pre-set points of time. Another example of an operational protocol 733 is directing the controller 706 to adjust the amount of power delivered to the power supply 740, thereby acting as a dimmer. Yet another example of an operational protocol 733 is to instruct the controller 706 how and when to tune the color output by one or more of the light sources 742 of the light fixture 702. Still another example of an operational protocol 733 is to check one or more communication links 705 with the network manager 780 and, if a communication link 705 is not functioning properly, allow the control module 704 to operate autonomously from the rest of the system 700.

As another example of an operational protocol 733, configurations of the control module 704 can be stored in memory 722 (e.g., non-volatile memory) so that the control module 704 (or portions thereof) can operate regardless of whether the control module 704 is communicating with the network manager 780 and/or other components in the system 700. Still another example of an operational protocol 733 is identifying an adverse condition or event (e.g., excessive humidity, no pressure differential, extreme pressure differential, high temperature) based on measurements taken by a sensor 760. In such a case, the controller 706 can notify the network manager 780 and/or the user 750 as to the adverse condition or event identified. Yet another example of an operational protocol 733 is to have the control module 704 operate in an autonomous control mode if one or more components (e.g., the communication module 708, the transceiver 724) of the control module 704 that allows the control module 704 to communicate with another component of the system 700 fails.

Sensor data 734 can be any data associated with (e.g., collected by) each sensor 760 that is communicably coupled to the control module 704. A sensor 760 can be newly added or pre-existing as part of the light fixture 702. Such data can include, but is not limited to, a manufacturer of the sensor 760, a model number of the sensor 760, communication capability of a sensor 760, power requirements of a sensor 760, and measurements taken by the sensor 760. Examples of a storage repository 730 can include, but are not limited to, a database (or a number of databases), a file system, a hard drive, flash memory, some other form of solid state data storage, or any suitable combination thereof. The storage repository 730 can be located on multiple physical machines, each storing all or a portion of the communication protocols 732, the operational protocols 733, and/or the sensor data 734 according to some example embodiments. Each storage unit or device can be physically located in the same or in a different geographic location.

The storage repository 730 can be operatively connected to the controller 706. In one or more example embodiments, the controller 706 includes functionality to communicate with the user 750, the network manager 780, the power source 795, and the sensors 760 in the system 700. More specifically, the controller 706 sends information to and/or receives information from the storage repository 730 in order to communicate with the user 750, the network manager 780, the power source 795, and the sensors 760. As discussed below, the storage repository 730 can also be operatively connected to the communication module 708 in certain example embodiments.

In certain example embodiments, the controller 706 of the control module 704 controls the operation of one or more components (e.g., the communication module 708, the timer 710, the transceiver 724) of the control module 704. For example, the controller 706 can activate the communication module 708 when the communication module 708 is in "sleep" mode and when the communication module 708 is needed to send data received from another component (e.g., a sensor 760, the user 750) in the system 700. As another example, the controller 706 can operate one or more sensors 760 to dictate when measurements are taken by the sensors 760 and when those measurements are communicated by the sensors 760 to the controller 706. As another example, the controller 706 can acquire the current time using the timer 710. The timer 710 can enable the control module 704 to control the light fixture 702 even when the control module 704 has no communication with the network manager 780.

As another example, the controller 706 can check one or more communication links 705 between the control module 704 and the network manager 780 and, if a communication link 705 is not functioning properly, allow the control module 704 to operate autonomously from the rest of the system 700. As yet another example, the controller 706 can store configurations of the control module 704 (or portions thereof) in memory 722 (e.g., non-volatile memory) so that the control module 704 (or portions thereof) can operate regardless of whether the control module 704 is communicating with the network controller 780 and/or other components in the system 700.

As still another example, the controller 706 can obtain readings from an adjacent sensor if the sensor 760 associated with the light fixture 702 malfunctions, if the communication link 705 (which can include electrical conductor 439 and/or coupling feature 459) between the sensor 760 and the control module 704 fails, and/or for any other reason that the readings of the sensor 760 associated with the light fixture 702 fails to reach the control module 704. To accomplish this, for example, the network manager 780 can instruct, upon a request from the controller 706, the adjacent sensor 760 to communicate its readings to the controller 706 of the control module 704 using communication links 705.

As still another example, the controller 706 can cause the control module 704 to operate in an autonomous control mode if one or more components (e.g., the communication module 708, the transceiver 724) of the control module 704 that allows the control module 704 to communicate with another component of the system 700 fails. Similarly, the controller 706 of the control module 704 can control at least some of the operation of one or more adjacent light fixtures in the system 700. As yet another example, the controller 706 can provide power and/or control (e.g., 0V-10V), by operating the switches 770 to correspond to a particular resistance of the resistors 775, to the light sources 742 based on instructions received from a user 750 or a network manager 780, and/or based on instructions stored in the storage repository 730.

In some cases, the instructions received by the controller 706 can be within a range of voltage (e.g., 0V-10V), where signals within a subrange (e.g., 2V-3V) corresponds to a specific instruction (e.g., open switches 3 and 4, and close switches 1 and 2). While some examples provided herein are in terms of volts, such as the examples above, those of ordinary skill in the art will appreciate that a range of currents can be provided to the light sources 742 by manipulating the switches 770 to correspond to a particular resistance of the resistors 775.

As still another example, the controller 706 can determine, using the energy metering module 711, when power is received from the power supply 740. The controller 706 can also determine, using the energy metering module 711, the quality of the power received from the power supply 740. The controller 706 can further determine whether the power source 795, through the power supply 740, is providing any instructions for operating the light fixture 702.

The controller 706 can provide control, communication, and/or other similar signals to the user 750, the network manager 780, the power source 795, the power supply 740, and one or more of the sensors 760. Similarly, the controller 706 can receive control, communication, and/or other similar signals from the user 750, the network manager 780, the power source 795, the power supply 740, and one or more of the sensors 760. The controller 706 can control each sensor 760 automatically (for example, based on one or more algorithms stored in the storage repository 730) and/or based on control, communication, and/or other similar signals received from another device through a communication link 705. The controller 706 may include a printed circuit board, upon which the hardware processor 720 and/or one or more discrete components of the control module 704 are positioned.

In certain example embodiments, the controller 706 can include an interface that enables the controller 706 to communicate with one or more components (e.g., power supply 740) of the light fixture 702. For example, if the power supply 740 of the light fixture 702 operates under IEC Standard 62386, then the power supply 740 can include a digital addressable lighting interface (DALI). In such a case, the controller 706 can also include a DALI to enable communication with the power supply 740 within the light fixture 702. Such an interface can operate in conjunction with, or independently of, the communication protocols 732 used to communicate between the control module 704 and the user 750, the network manager 780, the power source 795, and the sensors 760.

The controller 706 (or other components of the control module 704) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The isolated driver 707 of the control module 704 can be configured to isolate an electrical ground associated with the instructions received by the control module 704 from a user 750 and/or the network manager 780. In other words, the isolated driver 707 can be used to help prevent faults, surges, false signals, and other adverse conditions that can alter the instructions and/or prevent the control module 704 from operating properly.

The isolated driver 707 can include one or more of a number of components. Such components can include, but are not limited to, a capacitor, a resistor, a transformer, a Zener diode, and a transistor. In certain example embodiments, the isolated driver 707 can be part of an isolation zone 795 that electrically isolates the switches 770 of the control module 704 from transient signals that could alter the instructions, thereby causing the one or more of the switches 770 to operate incorrectly or inconsistently with the instructions provided by a user 750 and/or the network manager 780.

In certain example embodiments, the one or more switches 770 of the control module 704 is used to select one of a number of lumens or other output characteristics (e.g., CCT) of the light fixture 702. The switches 770 can be any of a number of types of switches, including but not limited to one or more DIP switches, one or more SIPP switches, one or more rocker switches, one or more reed switches, one or more magnetic switches, one or more rotary switches, one or more rotary dials, one or more selectors or selector switches, one or more slide switches, one or more snap switches, one or more thumbwheels, one or more toggles or toggle switches, one or more keys or keypads, one or more buttons or pushbuttons, part of an integrated circuit, logic implemented in software, one or more transistors (e.g., MOSFETs), and one or more of a number of discrete components that are coupled to each other. In other words, a switch 770 can be tangible or virtual, and can be a single discrete component or a number of components coupled to each other.

As discussed above, the control module 704 can include multiple switches 770. A switch can be manually controlled by a user 750. When the position of a switch 770 is manually controlled, the housing of the light fixture 702 can have an access panel (e.g., access aperture 129 described above) or other similar configuration to allow access by a user 750 to change the position of one or more switches 770. In addition, or in the alternative, a switch 770 can be controlled by the controller 706 of the control module 704.

When there are multiple switches 770, each switch 770 can be used to control, using the resistors 775, one or more light sources 742 (also called an array of light sources 742) of the light fixture 702. The controller 706 can be coupled to each of the switches 770 using communication links 705 (e.g., electrical conductors, wire traces). Each switch 770 has an open position and a closed position. When there are multiple switches 770, different combinations of positions of the various switches 770, which correspond to different resistances of the resistors 775, can alter the lumen output of the light fixture 702.

As shown above with respect to FIG. 5, each switch 770 is coupled to multiple resistors 775. Each resistor 775 can be a discrete component with a known resistance (e.g., 1 kΩ, 5 MΩ). In some cases, a resistor 775 can have a variable resistance (e.g., a potentiometer, a variable resistor) that has a user-selectable resistance within a range of resistances. A resistor 775 that corresponds to a particular combination of positions of the various switches 770 can be a single resistive component or multiple resistive components that are connected in series and/or in parallel with each other. Each selection of a switch 770 corresponds to a particular resistance of a downstream resistor 775, which in turn determines the amount of current that flows from the power supply 740, through the switch 770 and the corresponding resistor 775 (based on the configuration of the switch 770), and on to the light sources 742.

The communication module 708 of the control module 704 determines and implements the communication protocol (e.g., from the communication protocols 732 of the storage repository 730) that is used when the controller 706 communicates with (e.g., sends signals to, receives signals from) the user 750, the network manager 780, the power source 795, and/or one or more of the sensors 760. In some cases, the communication module 708 accesses the sensor data 734 to determine which communication protocol is used to communicate with the sensor 760 associated with the sensor data 734. In addition, the communication module 708 can interpret the communication protocol of a communication received by the control module 704 so that the controller 706 can interpret the communication.

The communication module 708 can send and receive data between the network manager 780, the power source 795, and/or the users 750 and the control module 704. The communication module 708 can send and/or receive data in a given format that follows a particular communication protocol 732. The controller 706 can interpret the data packet received from the communication module 708 using the communication protocol 732 information stored in the storage repository 730. The controller 706 can also facilitate the data transfer between one or more sensors 760 and the network manager 780, the power source 795, and/or a user 750 by converting the data into a format understood by the communication module 708.

The communication module 708 can send data (e.g., communication protocols 732, operational protocols 733, sensor data 734, operational information, error codes, threshold values, algorithms) directly to and/or retrieve data directly from the storage repository 730. Alternatively, the controller 706 can facilitate the transfer of data between the communication module 708 and the storage repository 730. The communication module 708 can also provide encryption to data that is sent by the control module 704 and decryption to data that is received by the control module 704. The communication module 708 can also provide one or more of a number of other services with respect to data sent from and received by the control module 704. Such services can include, but are not limited to, data packet routing information and procedures to follow in the event of data interruption.

The timer 710 of the control module 704 can track clock time, intervals of time, an amount of time, and/or any other measure of time. The timer 710 can also count the number of occurrences of an event, whether with or without respect to time. Alternatively, the controller 706 can perform the counting function. The timer 710 is able to track multiple time measurements concurrently. The timer 710 can track time periods based on an instruction received from the controller 706, based on an instruction received from the user 750, based on an instruction programmed in the software for the control module 704, based on some other condition or from some other component, or from any combination thereof.

The timer 710 can be configured to track time when there is no power delivered to the control module 704 (e.g., the power module 712 malfunctions) using, for example, a super capacitor or a battery backup. In such a case, when there is a resumption of power delivery to the control module 704, the timer 710 can communicate any aspect of time to the control module 704. In such a case, the timer 710 can include one or more of a number of components (e.g., a super capacitor, an integrated circuit) to perform these functions.

The energy metering module 711 of the control module 704 measures one or more components of power (e.g., current, voltage, resistance, VARs, watts) at one or more points (e.g., output of the power supply 740) associated with the light fixture 702. The energy metering module 711 can include any of a number of measuring devices and related devices, including but not limited to a voltmeter, an ammeter, a power meter, an ohmmeter, a current transformer, a potential transformer, and electrical wiring. The energy metering module 711 can measure a component of power continuously, periodically, based on the occurrence of an event, based on a command received from the controller 706, and/or based on some other factor.

The power module 712 of the control module 704 provides power to one or more other components (e.g., timer 710, controller 706) of the control module 704. In addition, in certain example embodiments, the power module 712 can provide power to the light sources 742 of the light fixture 702. The power module 712 can include one or more of a number of single or multiple discrete components (e.g., transistor, diode, resistor), and/or a microprocessor. The power module 712 may include a printed circuit board, upon which the microprocessor and/or one or more discrete components are positioned. In some cases, the power module 712 can include one or more components that allow the power module 712 to measure one or more elements of power (e.g., voltage, current) that is delivered to and/or sent from the power module 712.

The power module 712 can include one or more components (e.g., a transformer, a diode bridge, an inverter, a converter) that receives power (e.g., AC mains) from the power supply 740 and/or some other source of power (e.g., a battery, a source external to the light fixture 702). The power module 712 can use this power to generate power of a type (e.g., alternating current, direct current) and level (e.g., 12V, 24V, 120V) that can be used by the other components of the control module 704 and the light sources 742. In addition, or in the alternative, the power module 712 can be a source of power in itself to provide signals to the other components of the control module 704 and/or the light sources 742. For example, the power module 712 can be a battery or other form of energy storage device. As another example, the power module 712 can be a localized photovoltaic solar power system.

In certain example embodiments, the power module 712 of the control module 704 can also provide power and/or control signals, directly or indirectly, to one or more of the sensors 760. In such a case, the controller 706 can direct the power generated by the power module 712 to the sensors 760 and/or the light sources 742 of the light fixture 702. In this way, power can be conserved by sending power to the sensors 760 and/or the light sources 742 of the light fixture 702 when those devices need power, as determined by the controller 706.

The hardware processor 720 of the control module 704 executes software, algorithms, and firmware in accordance with one or more example embodiments. Specifically, the hardware processor 720 can execute software on the controller 706 or any other portion of the control module 704, as well as software used by the user 750, the network manager 780, the power source 795, the power supply 740, and/or one or more of the sensors 760. The hardware processor 720 can be an integrated circuit, a central processing unit, a multi-core processing chip, SoC, a multi-chip module including multiple multi-core processing chips, or other hardware processor in one or more example embodiments. The hardware processor 720 is known by other names, including but not limited to a computer processor, a microprocessor, and a multi-core processor.

In one or more example embodiments, the hardware processor 720 executes software instructions stored in memory 722. The memory 722 includes one or more cache memories, main memory, and/or any other suitable type of memory. The memory 722 can include volatile and/or non-volatile memory. The memory 722 is discretely located within the control module 704 relative to the hardware processor 720 according to some example embodiments. In certain configurations, the memory 722 can be integrated with the hardware processor 720.

In certain example embodiments, the control module 704 does not include a hardware processor 720. In such a case, the control module 704 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the control module 704 (or portions thereof) to be programmable and function according to certain logic rules and thresholds without the use of a hardware processor. Alternatively, FPGAs, IGBTs, ICs, and/or similar devices can be used in conjunction with one or more hardware processors 720.

The transceiver 724 of the control module 704 can send and/or receive control and/or communication signals. Specifically, the transceiver 724 can be used to transfer data between the control module 704 and the user 750, the network manager 780, the power source 795, the power supply 740, and/or the sensors 760. The transceiver 724 can use wired and/or wireless technology. The transceiver 724 can be configured in such a way that the control and/or communication signals sent and/or received by the transceiver 724 can be received and/or sent by another transceiver that is part of the user 750, the network manager 780, the power source 795, the power supply 740, and/or the sensors 760. The transceiver 724 can use any of a number of signal types, including but not limited to radio frequency signals and visible light signals.

When the transceiver 724 uses wireless technology, any type of wireless technology can be used by the transceiver 724 in sending and receiving signals. Such wireless technology can include, but is not limited to, Wi-Fi, visible light communication, cellular networking, BLE, Zigbee, and Bluetooth. The transceiver 724 can use one or more of any number of suitable communication protocols (e.g., ISA100, HART) when sending and/or receiving signals. Such communication protocols can be stored in the communication protocols 732 of the storage repository 730. Further, any transceiver information for the user 750, the network manager 780, the power source 795, the power supply 740, and/or the sensors 760 can be part of the communication protocols 732 (or other areas) of the storage repository 730.

Optionally, in one or more example embodiments, the security module 728 secures interactions between the control module 704, the user 750, the network manager 780, the power source 795, the power supply 740, and/or the sensors 760. More specifically, the security module 728 authenticates communication from software based on security keys verifying the identity of the source of the communication. For example, user software may be associated with a security key enabling the software of the user 750 to interact with the control module 704. Further, the security module 728 can restrict receipt of information, requests for information, and/or access to information in some example embodiments.

As mentioned above, aside from the control module 704 and its components, the light fixture 702 can include one or more sensors 760, a power supply 740, and one or more light sources 742. The sensors 760 are described above. The light sources 742 of the light fixture 702 are devices and/or components typically found in a light fixture to allow the light fixture 702 to operate. The light sources 742 emit light using power provided by the power supply 740. The light fixture 702 can have one or more of any number and/or type (e.g., light-emitting diode, incandescent, fluorescent, halogen) of light sources 742. A light source 742 can vary in the amount and/or color of light that it emits.

The power supply 740 of the light fixture 702 receives power (also called primary power or AC mains power) from the power source 795. The power supply 740 uses the power it receives to generate and provide power (also called final power herein) to the control module 704. The power supply 740 can be called by any of a number of other names, including but not limited to a driver, a LED driver, and a ballast. The power supply 740 can include one or more of a number of single or multiple discrete components (e.g., transistor, diode, resistor), and/or a microprocessor. The power supply 740 may include a printed circuit board, upon which the microprocessor and/or one or more discrete components are positioned.

In some cases, the power supply 740 can include one or more components (e.g., a transformer, a diode bridge, an inverter, a converter) that receives power from the power source 795 and generates power of a type (e.g., alternating current, direct current) and level (e.g., 12V, 24V, 120V) that can be used by the control module 704. In addition, or in the alternative, the power supply 740 can be a source of power in itself. For example, the power supply 740 can or include be a battery, a localized photovoltaic solar power system, or some other source of independent power.

While not expressly shown or described herein, the light fixture 702 with an example control module 704 can also include one or more of a number of other components that are not critical to the use of example embodiments. Examples of such other components can include, but are not limited to, a heat sink, an electrical conductor or electrical cable, a terminal block, a lens, a diffuser, a reflector, an air moving device, a baffle, a potting compound, and a circuit board.

As stated above, the light fixture 702 can be placed in any of a number of environments. In such a case, the housing of the light fixture 702, which includes the example control module 704, can be configured to comply with applicable standards for any of a number of environments. For example, the light fixture 702 can be rated as a Division 1 or a Division 2 enclosure under NEC standards. Similarly, the control module 704, any of the sensors 760, or other devices communicably coupled to the light fixture 702 can be configured to comply with applicable standards for any of a number of environments.

Figure 8:
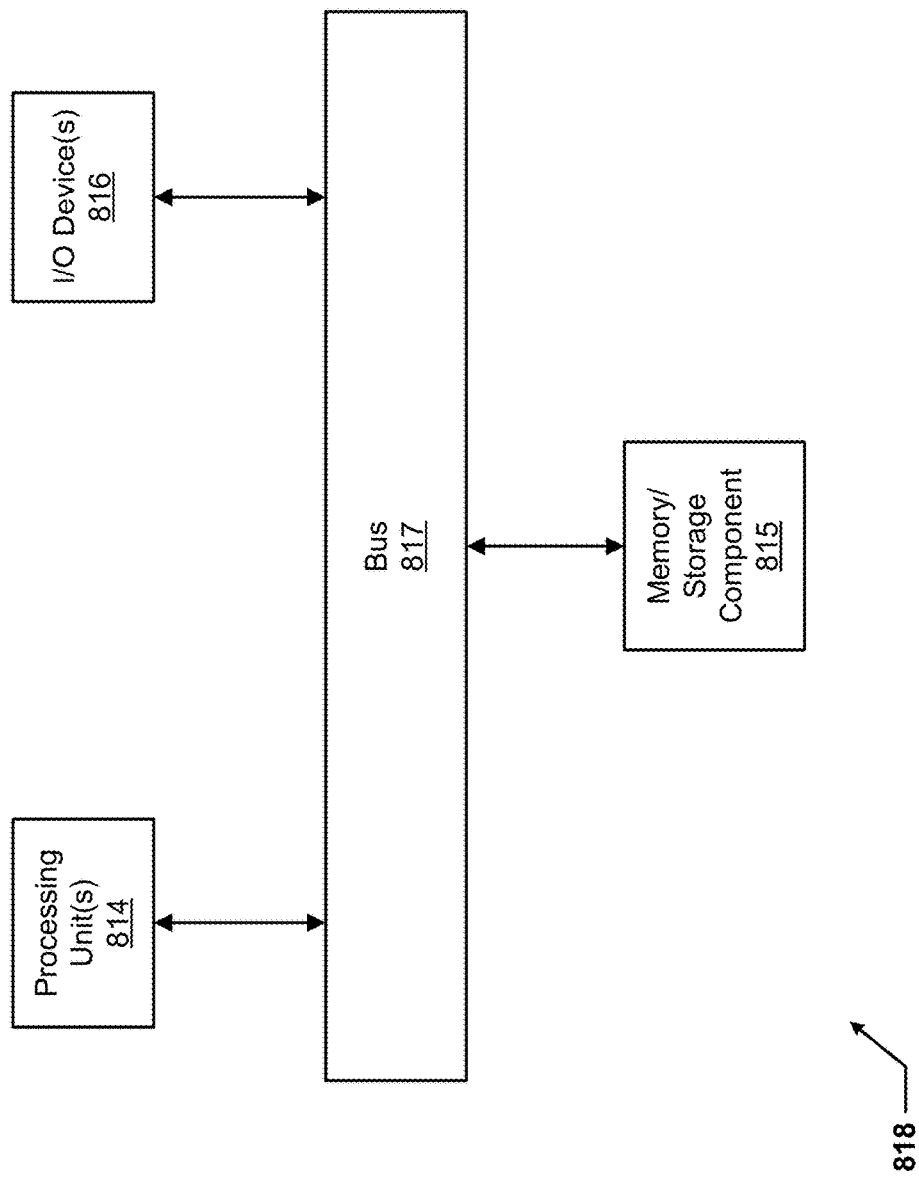
FIG. 8 shows a computing device in accordance with certain example embodiments.

FIG. 8 illustrates one embodiment of a computing device 818 that implements one or more of the various techniques described herein, and which is representative, in whole or in part, of the elements described herein pursuant to certain example embodiments. Computing device 818 is one example of a computing device and is not intended to suggest any limitation as to scope of use or functionality of the computing device and/or its possible architectures. Neither should computing device 818 be interpreted as having any dependency or requirement relating to any one or combination of components illustrated in the example computing device 818.

Computing device 818 includes one or more processors or processing units 814, one or more memory/storage components 815, one or more input/output (I/O) devices 816, and a bus 817 that allows the various components and devices to communicate with one another. Bus 817 represents one or more of any of several types of bus structures, including a memory bus or memory controller, a peripheral bus, an accelerated graphics port, and a processor or local bus using any of a variety of bus architectures. Bus 817 includes wired and/or wireless buses.

Memory/storage component 815 represents one or more computer storage media. Memory/storage component 815 includes volatile media (such as random access memory (RAM)) and/or nonvolatile media (such as read only memory (ROM), flash memory, optical disks, magnetic disks, and so forth). Memory/storage component 815 includes fixed media (e.g., RAM, ROM, a fixed hard drive, etc.) as well as removable media (e.g., a Flash memory drive, a removable hard drive, an optical disk, and so forth).

One or more I/O devices 816 allow a customer, utility, or other user to enter commands and information to computing device 818, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 818 is connected to a network (not shown) (e.g., a LAN, a WAN such as the Internet, the cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 818 includes at least the minimal processing, input, and/or output means necessary to practice one or more embodiments.

Further, those skilled in the art will appreciate that one or more elements of the aforementioned computer device 818 is located at a remote location and connected to the other elements over a network in certain example embodiments. Further, one or more embodiments is implemented on a distributed system having one or more nodes, where each portion of the implementation (e.g., controller 706) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

As will be appreciated by those of ordinary skill, the textual and illustrated disclosure provided herein supports a wide range of embodiments and implementations. In some non-limiting example embodiments of the disclosure, a luminaire can comprise: a housing; a substrate disposed in the housing; a first plurality of light emitting diodes that are mounted to the substrate and that have a first color temperature; a second plurality of light emitting diodes that are mounted to the substrate and that have a second color temperature; and a plurality of manual switches that are disposed at the housing for permanently configuring the luminaire to: provide illumination of the first color temperature by enabling the first plurality of light emitting diodes; provide illumination of the second color temperature by enabling the second plurality of light emitting diodes; and provide illumination of a third color temperature that is between the first color temperature and the second color temperature by enabling the first plurality of light emitting diodes and the second plurality of light emitting diodes.

In some example embodiments of the luminaire, the housing can comprise an aperture that is configured for emitting area illumination, and the substrate is oriented to emit light through the aperture. In some example embodiments of the luminaire, the plurality of manual switches are mounted to the substrate. In some example embodiments of the luminaire, the plurality of manual switches are mounted in the housing. In some example embodiments of the luminaire, the plurality of manual switches are mounted to the housing. In some example embodiments of the luminaire, the plurality of manual switches comprise a dual inline pin (DIP) switch.

In some example embodiments of the luminaire, the plurality of manual switches provide two switch states, and each of the two switch states provides illumination of the third color temperature by enabling the first plurality of light emitting diodes and the second plurality of light emitting diodes. In some example embodiments of the luminaire, the housing is circular and comprises a lip configured for extending around an aperture in a ceiling. In some example embodiments of the luminaire, the housing comprises a wiring port disposed on a side of the housing. In some example embodiments of the luminaire, the housing comprises a light-emitting aperture in which the substrate is disposed.

In some example embodiments, the luminaire further comprises: an aperture disposed at a lower side of the housing; a lens disposed at the aperture for refracting light emitted by the first and second light emitting diodes; and a reflector that is disposed between the lens and the light emitting diodes and that is operative to reflect light between the first and second light emitting diodes and the lens. In some example embodiments of the luminaire, the housing is circular and comprises a lip configured for extending around an aperture in a ceiling. In some example embodiments of the luminaire, the housing comprises a wiring port disposed on a side of the housing. In some example embodiments of the luminaire, the housing forms a cavity associated with the aperture. In some example embodiments of the luminaire, the first and second light source are mounted to a substrate that is disposed at an end of the cavity. In some example embodiments, the luminaire further comprises a reflector that is disposed in the cavity between the lens and the first and second light sources, the reflector operative to reflect light between the first and second light sources and the lens.

Technology for providing a configurable a luminaire has been described. Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A luminaire comprising:
a control module comprising:
at least one first switch that has multiple positions; and
a plurality of resistive components coupled to the at least one first switch, wherein each position of the at least one first switch corresponds to a resistance of the plurality of resistive components, wherein the resistance determines a current level of a plurality of current levels when power is applied to the plurality of resistive components; and
a light source coupled to the control module, wherein the light source emits an output based on the current level received from the control module,
wherein the at least one first switch, when in any position of the multiple positions, and at least one of the plurality of resistive components are coupled to the light source,
wherein the light source illuminates when the power flows through the control module to the light source, regardless of the position of the at least one first switch.

2. The luminaire of claim 1, wherein the output controlled by the control module comprises an amount of lumens.

3. The luminaire of claim 1, wherein the output controlled by the control module comprises a color.

4. The luminaire of claim 1, wherein the control module further comprises a controller, wherein the controller comprises a transceiver that receives instructions from a user, wherein the instructions determine the position of the at least one first switch, wherein the controller sets the position of the at least one first switch based on the instructions.

5. The luminaire of claim 1, further comprising:
a second switch disposed in parallel with the at least one first switch.

6. The luminaire of claim 1, wherein the at least one first switch is a physical switch that is manipulated by a user to select the position of the at least one first switch.

7. The luminaire of claim 6, wherein the at least one first switch is disposed remotely from a housing of the luminaire.

8. The luminaire of claim 7, wherein the plurality of resistive components are disposed remotely from the housing of the luminaire.

9. The luminaire of claim 1, wherein the at least one first switch is microprocessor-based.

10. A control module for controlling an output of a plurality of light sources of a luminaire, the control module comprising:
at least one switch having a plurality of positions, and
a plurality of resistive components coupled to the at least one switch and having a plurality of resistances, wherein each position of the at least one switch corresponds to a resistance of the plurality of resistive components,
wherein the at least one switch, when in any position of the plurality of positions, and at least one of the plurality of resistive components are configured to be coupled to all of the plurality of light sources,
wherein the plurality of resistive components are configured to deliver a current level of a plurality of current levels to all of the plurality of light sources of the luminaire when power is applied to the plurality of resistive components, thereby illuminating all of the plurality of light sources irrespective of the position of the at least one switch,
wherein the current level is based on the resistance of the plurality of resistive components.

11. The control module of claim 10, further comprising:
a controller coupled to the at least one switch, wherein the controller controls the plurality of positions of the at least one switch.

12. The control module of claim 11, further comprising:
a transceiver coupled to the controller, wherein the transceiver is configured to receive instructions for selecting the output by the light sources of the luminaire.

13. The control module of claim 12, wherein the transceiver communicates using wireless technology.

14. The control module of claim 10, wherein the output of the light sources is a lumen output.

15. The control module of claim 10, wherein the plurality of resistive components are coupled in parallel to each other and in series with the at least one switch.

16. The control module of claim 10, wherein a first resistive component and a second resistive component of the plurality of resistive components are connected in series with each other, wherein a third resistive component of the plurality of resistive components is connected in parallel with the first resistive component.

17. The control module of claim 10, wherein the output of the light sources is a color.

18. A luminaire comprising:
a control module comprising:
at least one first switch that has multiple positions; and
a plurality of resistive components coupled to the at least one first switch, wherein each position of the at least one first switch corresponds to a resistance of the plurality of resistive components, wherein the resistance determines a current level of a plurality of current levels when power is applied to the plurality of resistive components; and
a plurality of light sources coupled to the color control module, wherein the plurality of light sources emit an output based on the current level received from the control module,
wherein the at least one first switch, when in any position of the multiple positions, and at least one of the plurality of resistive components are coupled to the plurality of light sources,
wherein all of the plurality of light sources illuminate when the power flows through the control module to the plurality of light sources, regardless of the position of the at least one first switch.

19. The luminaire of claim 18, wherein the output controlled by the control module comprises an amount of lumens.

20. The luminaire of claim 18, wherein the output controlled by the control module comprises a color.

* * * * *